(12) United States Patent
Kuchii et al.

(10) Patent No.: US 7,783,103 B2
(45) Date of Patent: Aug. 24, 2010

(54) DEFECT DETECTING DEVICE, IMAGE SENSOR DEVICE, IMAGE SENSOR MODULE, IMAGE PROCESSING DEVICE, DIGITAL IMAGE QUALITY TESTER, AND DEFECT DETECTING METHOD

(75) Inventors: Toshimasa Kuchii, Nara (JP); Hideyuki Ichihara, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 955 days.

(21) Appl. No.: 11/526,780

(22) Filed: Sep. 26, 2006

(65) Prior Publication Data
US 2007/0071304 A1    Mar. 29, 2007

(30) Foreign Application Priority Data
Sep. 27, 2005    (JP)    ............................. 2005-280888

(51) Int. Cl.
G06K 9/40 (2006.01)
G01N 21/00 (2006.01)
G01N 21/84 (2006.01)
H04N 1/38 (2006.01)

(52) U.S. Cl. .................... 382/149; 382/263; 356/239.1; 356/430; 358/464

(58) Field of Classification Search .................. 382/141, 382/149, 263, 128, 254, 260, 100; 348/177, 348/246, 247, 363, E5.081, E5.082; 257/E27.151, 257/E21.645, E27.081; 356/239.1, 430; 313/497; 430/945, 396, 311; 250/548; 358/464
See application file for complete search history.

(56) References Cited

U.S. PATENT DOCUMENTS

| | | | | |
|---|---|---|---|---|
| 4,589,140 A | * | 5/1986 | Bishop et al. ................ | 382/148 |
| 4,958,373 A | * | 9/1990 | Usami et al. ................ | 382/149 |
| 5,272,763 A | * | 12/1993 | Maruyama et al. ........... | 382/147 |
| 5,274,713 A | * | 12/1993 | Chang et al. ................. | 382/141 |
| 5,309,108 A | * | 5/1994 | Maeda et al. ................ | 324/501 |
| 5,309,222 A | * | 5/1994 | Kamei et al. ................. | 356/613 |

(Continued)

FOREIGN PATENT DOCUMENTS

JP    4-270592 A    9/1992

(Continued)

OTHER PUBLICATIONS

Yuanyan et al., "Computer Vision-based On line Detection System on Glass Bottles Crack", Computer Applications, vol. 21, No. 11, Nov. 2001.

(Continued)

Primary Examiner—Sheela C Chawan
(74) Attorney, Agent, or Firm—Birch, Stewart, Kolasch & Birch, LLP

(57) ABSTRACT

A defect detecting device includes: a block generating section dividing an inspection image in which a defective region will be detected into a plurality of blocks; an intra-block sum calculating section calculating an intra-block sum for each of the blocks generated by the block generating section, the intra-block sum being a sum of pixel data for pixels in that block; and a statistical processing section and a defect determining section determining whether there exists a defective region by determining through statistical processing whether the intra-block sums have an outlier. Accordingly, the device determines whether there is a defective region in a digital image quickly and using small circuitry.

33 Claims, 26 Drawing Sheets

U.S. PATENT DOCUMENTS

| | | | |
|---|---|---|---|
| 5,379,122 A * | 1/1995 | Eschbach | 382/248 |
| 5,854,655 A | 12/1998 | Watanabe et al. | |
| 5,892,853 A * | 4/1999 | Hirani et al. | 382/280 |
| 5,917,953 A * | 6/1999 | Ausbeck, Jr. | 382/239 |
| 6,002,433 A | 12/1999 | Watanabe et al. | |
| 7,092,018 B1 | 8/2006 | Watanabe | |
| 2004/0179738 A1 * | 9/2004 | Dai et al. | 382/218 |
| 2006/0232691 A1 | 10/2006 | Watanabe | |
| 2006/0233431 A1 | 10/2006 | Watanabe | |

FOREIGN PATENT DOCUMENTS

| | | |
|---|---|---|
| JP | 06-284346 A | 10/1994 |
| JP | 9-65378 A | 3/1997 |
| JP | 11-027585 A | 1/1999 |
| JP | 2000-199745 A | 7/2000 |
| JP | 2004-279891 A | 10/2004 |
| JP | 2004-294202 A | 10/2004 |
| JP | 2006-135700 A | 5/2006 |
| KR | 10-0152048 B1 | 6/1998 |
| KR | 2001-0067343 A | 7/2001 |

OTHER PUBLICATIONS

Tetsuya et al., "Image Quality Inspection Algorithm for Flat Panel Dsplays and Image Sensors" vol. 47, No. 3, pp. 107-110 (2003).

* cited by examiner

FIG. 4

|   | 0 | 1 | 2 | 3 | 4 | 5 | 6 | 7 | 8 |
|---|---|---|---|---|---|---|---|---|---|
| 0 | 0 | 0 | 0 | -1 | -1 | -1 | 0 | 0 | 0 |
| 1 | 0 | 0 | 0 | -1 | -1 | -1 | 0 | 0 | 0 |
| 2 | 0 | 0 | 0 | -1 | -1 | -1 | 0 | 0 | 0 |
| 3 | -1 | -1 | -1 | 4 | 4 | 4 | -1 | -1 | -1 |
| 4 | -1 | -1 | -1 | 4 | 4 | 4 | -1 | -1 | -1 |
| 5 | -1 | -1 | -1 | 4 | 4 | 4 | -1 | -1 | -1 |
| 6 | 0 | 0 | 0 | -1 | -1 | -1 | 0 | 0 | 0 |
| 7 | 0 | 0 | 0 | -1 | -1 | -1 | 0 | 0 | 0 |
| 8 | 0 | 0 | 0 | -1 | -1 | -1 | 0 | 0 | 0 |

$$\text{Result}(x,y) = \left| \sum_{j=0}^{8} \sum_{i=0}^{8} \text{Filter}(i,j) * \text{Data}(x-4+i, y-4+j) \right|$$

x: X-coordinate of Pixel (4 ≤ x ≤ Horizontal Pixel Count Before Filtering − 5)
y: Y-coordinate of Pixel (4 ≤ y ≤ Vertical Pixel Count Before Filtering − 5)
i: X-coordinate in Filter Matrix ( i=0,1,2, ... ,8 )
j: Y-coordinate in Filter Matrix ( j=0,1,2, ... ,8 )
Data(x-4+i, y-4+j): Pixel Data at (x-4+i, y-4+j) Before Filtering
Result(x, y): Pixel Data at (x, y) After Filtering
Filter(I, j): Data at (i, j) in Filter Matrix

|   | 0 | 1 | 2 |
|---|---|---|---|
| 0 | 1 | 1 | 1 |
| 1 | 1 | 1 | 1 |
| 2 | 1 | 1 | 1 |

|   | 0 | 1 | 2 | 3 | 4 | 5 | 6 | 7 | 8 |
|---|---|---|---|---|---|---|---|---|---|
| 0 | 0 | 0 | 0 | 0 | 0 | 0 | 0 | 0 | 0 |
| 1 | 0 | 0 | 0 | 0 | -1 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 0 | -1 | 0 | 0 | 4 | 0 | 0 | -1 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |
| 7 | 0 | 0 | 0 | 0 | -1 | 0 | 0 | 0 | 0 |
| 8 | 0 | 0 | 0 | 0 | 0 | 0 | 0 | 0 | 0 |

$$\text{Result1}(x,y) = \sum_{j=0}^{2}\sum_{i=0}^{2} \text{Filter1}(i,j) * \text{Data}(x-1+i, y-1+j)$$

x: X-coordinate of Pixel (4 ≤ x ≤ Horizontal Pixel Count Before Filtering − 2)
y: Y-coordinate of Pixel (4 ≤ y ≤ Vertical Pixel Count Before Filtering − 2)
i: X-coordinate in First Filter Matrix ( i=0, 1, 2 )
j: Y-coordinate in First Filter Matrix ( j=0, 1, 2 )
Data(x−1+i, y−1+j): Pixel Data at (x−1+i, y−1+j) Before Filtering
Result1(x, y): Pixel Data at (x, y) After First Filtering
Filter1(i, j): Data at (i, j) in First Filter Matrix $$\text{Result2}(x,y) = \left| \sum_{j=0}^{2}\sum_{i=0}^{2} \text{Filter2}(3*i+1, 3*j+1) * \text{Result1}(x-3+3*i, y-3+3*j) \right|$$

x: X-coordinate of Pixel (4 ≤ x ≤ Horizontal Pixel Count After First Filtering − 5)
y: Y-coordinate of Pixel (4 ≤ y ≤ Vertical Pixel Count After First Filtering − 5)
3*i+1: X-coordinate in Second Filter Matrix ( i=0, 1, 2 )
3*j+1: Y-coordinate in Second Filter Matrix ( j=0, 1, 2 )
Result1(x−3+3*i, y−3+3*j): Pixel Data at (x−3+3*i, y−3+3*j) After First Filtering
Result2(x, y): Pixel Data at (x, y) After Second Filtering
Filter2(3*i+1, 3*j+1): Data at (3*i+1, 3*j+1) in Second Filter Matrix

FIG. 9

$$Block(x,y) = \sum_{j=0}^{blocksize-1} \sum_{i=0}^{blocksize-1} Data(x*blocksize+i, y*blocksize+j)$$

Blocksize: Horizontal and Vertical Pixel Counts in One Block
x: X-coordinate of Block (0 ≤ x ≤ Horizontal Pixel Count/Blocksize − 1)
y: Y-coordinate of Block (0 ≤ y ≤ Vertical Pixel Count/Blocksize − 1)
i: X-coordinate of Pixel in Block at (x, y) (Leftmost Pixels Located at (0, y))
j: Y-coordinate of Pixel in Block at (x, y) (Uppermost Pixels Located at (x, 0))
Data(x*blocksize+i, y*blocksize+j): Pixel Data at (x*blocksize+i, y*blocksize+j)
Block(x, y): Sum of Pixel Data in (x, y) Block

| Intra-block Sum | Number of Blocks |
|---|---|
| 6000 | 0 |
| 8000 | 0 |
| 10000 | 65 |
| 12000 | 663 |
| 14000 | 1486 |
| 16000 | 634 |
| 18000 | 40 |
| 20000 | 2 |
| 22000 | 0 |
| 24000 | 1 |
| 26000 | 0 |
| 28000 | 0 |
| 30000 | 3 |
| 32000 | 0 |
| 34000 | 0 |
| 36000 | 1 |
| 38000 | 1 |
| 40000 | 0 |
| 42000 | 0 |
| 44000 | 1 |
| 46000 | 0 |
| 48000 | 0 |
| Next Grade | 1 |

| Minimum | 8121 |
|---|---|
| Maximum | 55887 |
| Average | 13014.73 |
| Standard Deviation | 1908.51 |

FIG. 24 (a)

Smoothing Filter

|   | 0 | 1 | 2 |
|---|---|---|---|
| 0 | 1/9 | 1/9 | 1/9 |
| 1 | 1/9 | 1/9 | 1/9 |
| 2 | 1/9 | 1/9 | 1/9 |

FIG. 24 (b)

Laplacian Filter

|   | 0 | 1 | 2 |
|---|---|---|---|
| 0 | 0 | -1 | 0 |
| 1 | -1 | 4 | -1 |
| 2 | 0 | -1 | 0 |

FIG. 25

$$\text{Result}(x,y) = \left| \sum_{j=0}^{2} \sum_{i=0}^{2} \text{Filter}(i,j) * \text{Data}(x-1+i, y-1+j) \right|$$

x: X-coordinate of Pixel (1 ≤ x ≤ Horizontal Pixel Count Before Filtering − 2)
y: Y-coordinate of Pixel (1 ≤ y ≤ Vertical Pixel Count Before Filtering − 2)
i: X-coordinate in Filter Matrix ( i=0, 1, 2 )
j: Y-coordinate in Filter Matrix ( j=0, 1, 2 )
Data(x−1+i, y−1+j): Pixel Data at (x−1+i, y−1+j) Before Filtering
Result(x, y): Pixel Data at (x, y) After Filtering
Filter(i, j): Data at (i, j) in Filter Matrix

☐ :1  ▨ :0

DEFECT DETECTING DEVICE, IMAGE SENSOR DEVICE, IMAGE SENSOR MODULE, IMAGE PROCESSING DEVICE, DIGITAL IMAGE QUALITY TESTER, AND DEFECT DETECTING METHOD

This nonprovisional application claims priority under 35 U.S.C. §119(a) on Patent Application No. 2005-280888 filed in Japan on Sep. 27, 2005, the entire contents of which are hereby incorporated by reference.

FIELD OF THE INVENTION

The present invention relates to a defect detecting device having small circuitry, but still being capable of quickly determining whether there is a defective region in a digital image. The invention also relates to an associated image sensor device, image sensor module, image processing device, digital image quality tester, defect detecting method, defect detecting computer program, and computer-readable storage medium. The invention enables small circuitry to quickly determine whether there is a defective region in a digital image. The invention is especially suitable for use in quality inspection of image sensor devices (there is growing demand for high quality image sensor devices). The invention is applicable not only to the inspection of output images from image sensor devices, but to the inspection of digital image displays produced on liquid crystal panels and other, less typical flat panels.

BACKGROUND OF THE INVENTION

It is very important in the inspection of digital image quality to determine whether there is a defective region where pixel data changes non-uniformly. Especially, recent years have seen demand for image sensor devices growing in increasing numbers of applications, such as digital still cameras and mobile phones with a built-in camera. There is a large demand for image sensor devices with enhanced quality, accordingly. To achieve this, spot defects and stain defects, which are defective regions in a digital image (image sensor image) output of an image sensor device, increasingly need to be detected in the course of an inspection step.

Image data is never uniform across the screen even on a high quality image sensor device due to shading and noise. The "shading" refers to gradual changes in pixel data (pixel values) with respect to the coordinates of a pixel. Especially, when an image sensor image has a point defect, spot defect, or stain defect, the pixel data changes in a complex manner in accordance with that particular defect. This is the primary reason why spot defects and stain defects needs to be inspected.

The image sensor devices have increasing numbers of pixels, while delivery time for products with short product life cycles, like mobile phones, is becoming shorter. The situation has created another strong demand for reduced inspection time.

Conventionally, the image sensor image were inspected visually by inspection personnel for spot defects and stain defects. The inspection inevitably relies on the subjective evaluation by the inspection personnel. This could be a cause for different inspection standards among inspection personnel, inconsistent inspection results due to the physical condition of the inspector at the time of inspection, and difficulty in quantification of spot and stain defects. Inspection apparatus has been recently developed which quantifies and detects spot and stain defects. Automated processes are gradually being introduced.

Now, we define a "spot defect" and a "stain defect." A "point defect" which occurs in an image sensor image is also defined.

A "point defect" is a pixel, in an image sensor image, where data assumes vastly and markedly different values when compared with the surrounding pixels. A "spot defect" is a cluster of pixels where data assumes different values from the surrounding pixels. The differences are however smaller than those in the case of a point defect. A "stain defect" is a larger cluster of pixels than a spot defect where data assumes different values from the surrounding pixels. The differences are however smaller than those in the case of a spot defect.

FIG. 21 is a schematic showing a point defect, spot defect, and stain defect. Referring to the figure, in the inspection image 100, the point defect 110 occupies a small area. The spot defect 120 occupies a greater area. The stain defect 130 occupies an even greater area. The "inspection image" is a sample image output of an image sensor for the purpose of detecting spot defects and stain defects.

Next, we will describe shading. "Shading" refers to a phenomenon in which pixel data changes gradually over a greater region than the stain defect with the pixel data decreasing toward the top/bottom/right/left edges of the image sensor image. This is due to relatively poor sensitivity of pixels along the edges of the image in comparison to the sensitivity of the pixels at the center.

FIG. 22 shows an inspection image 100, as an example, in which a spot defect 120 occurs. In FIG. 22, shading 140 is observed in which pixel data decreases toward the top/bottom/right/left edges of the inspection image 100.

As mentioned earlier, inspection apparatus has been recently developed which quantifies and detects spot and stain defects, and automated processes are gradually being introduced. As an example of such technology, we refer to a non-patent document, "Image Quality Inspection Algorithm for Flat Panel Displays," Yokokawa Technical Report, Vol. 47, No. 3, 2003.

As shown in a flow chart in FIG. 23, the technology described in the document involves two major processes: a defect enhancement process (step 100, or simply "S100") and a defective region extraction process (S200). The image inspected for spot defects and stain defects by the flow in FIG. 23 is produced by shining white or other monochromatic light which shows no changes in luminance or color onto an image sensor device.

The defect enhancement process (S100) filters out shading, noise, and point defects to render spot defects and stain defects in the inspection image easier to detect. Specifically, the defect enhancement process, as shown in FIG. 23, includes an image reduction step (S110), a shading correction step (S120), a noise removing step (S130) with a smoothing filter, a point defect removing step (S140) with a point defect removing filter, and an edge detecting step (S150) with a Laplacian filter. These steps in the defect enhancement process (S100) will be described later in detail.

The defective region extraction process (S200) includes a step for binarizing pixel data (S210), a step for removing concave/convex noise from the inspection image binarized in S210 (S220), a step for allocating identification numbers to potentially defective regions (S230, or "labeling step), a step for calculating feature quantities (spot area, contrast, luminance gradient, etc.) of all the regions identified by numbers in S230 (S240), and a step for determining from the feature quantities calculated in S240 whether the potentially defective regions are really defective (S250). These steps in the defective region extraction process (S200) will be described later in detail.

The steps in the defect enhancement process (S100) and the defective region extraction process (S200) will now be described one by one.

The image reduction step (S110) reduces the image in both vertical and horizontal dimensions. The downscaling reduces the data size of the inspection image and makes spot and stain defects more prominent.

The shading correction step (S120) compensates for reduction in pixel data due to shading to remove the effect of shading from the inspection image. The shading correction step, for example, calculates average pixel data for 9 pixels in a 3×3 pixel matrix with a target pixel at its center and replaces the pixel data of the target pixel with that pixel data divided by the average pixel data.

The noise removing step (S130) removes noise from the inspection image with, for example, a smoothing filter. The smoothing filter refers to a filter capable of removing high frequency components from the image, thus removing noise. FIG. 24(a) shows an example of this filtering, where the smoothing filter has calculated average pixel data for the 9 pixels in a 3×3 pixel region with a target pixel at its center and replaced the pixel data of the target pixel with the average pixel data.

The point defect removing step (S140) removes point defects from the inspection image with a point defect removing filter. The point defect removing filter refers to a filter which, for example, calculates the median, maximum, and minimum pixel data for the 9 pixels in a 3×3 pixel region with a target pixel at its center and if the pixel data of the target pixel is either the maximum or minimum, replaces that pixel data with the median pixel data.

The edge detecting step (S150) enhances the edges of spot defects and stain defects with, for example, a Laplacian filter. The Laplacian filter refers to a filter extracting edges in density change from the image. FIG. 24(b) shows this filtering, where the Laplacian filter has subtracted the pixel data of the top/bottom/right/left pixels of a target pixel (4 neighboring pixels) from four times the pixel data of the target pixel and replaces the pixel data of the target pixel with the difference.

FIG. 25 shows a formula embodied in the filters in FIG. 24(a) and FIG. 24(b). Generally, in filtering, it should be considered which parts of the image are eligible for the filtering. For example, filtering on 3×3 pixels does not work with pixels along the edges of the image, since those pixels do not have a complete set of adjacent pixels. So, attention should be paid to the initial and last values in an image scan loop.

The binarizing step (S210) compares pixel data of the inspection image with a predetermined threshold to convert the data to binary data (0s or 1s). The binarization is aimed at reducing the quantity of information and facilitating the extraction of geometric shapes and the calculation of their areas. The threshold by which the binary data is determined to be either 1s or 0s may be a constant value across the image or specified for each region.

The inspection image binarized in the binarization step S210 is then subjected to the noise removing step S220 where concave/convex noise is removed. The noise removing step is done by dilation/erosion, isolated point removal, etc.

Dilation/erosion will be now described. Dilation/erosion is an image processing method which removes fine concave/convex noise around a targeted object from a binary image. Specifically, in a dilation, if even only one of the pixels in the proximity of a target pixel (close pixels) is "1," the pixel data of the target pixel is set to 1. In an erosion, if even only one of the pixels in the close pixels is "0," the pixel data of the target pixel is set to 0. Dilation and erosion are often used together.

A dilation, followed by an erosion, removes small concave noise from the object. An erosion, followed by a dilation, removes small convex noise.

Referring now to FIG. 26, the process from the binarized inspection image 150 to the dilation/erosion noise removal will be described. Assume that the inspection image 150 has three noise pixels 151. The noise pixels 151 are removed in a dilation carried out on the inspection image 152 which is a result of an erosion on the inspection image 150. The result is an inspection image 153. In FIG. 26, "1" pixels are white squares, and "0" pixels are black squares.

The isolated point removal, for example, replaces the pixel data of a target pixel with the pixel data of its 8 surrounding pixels in a binary image if the pixel data of the target pixel is 0 (or 1) and the pixel data of its 8 surrounding pixels is 1 (or 0).

Next, the labeling step S230 will be described. The labeling step divides continuous objects in the image into groups and allocates identification numbers. Normally, the labeling step, while scanning the whole image, determines whether or not pixels are continuous and allocates labeling numbers to the pixels. In the labeling step, those objects which are determined to belong to different groups in an initial stage of the scan may turn out, after the scan, to belong to a single continuous object. The labeling should therefore be done sequentially in normal situations.

Suppose, as an example, an inspection image 160 with pixel data specified as shown in FIG. 27. The inspection image 160 includes three continuous objects 161, 162, 163 where pixel data is all 1s. Carried out on the inspection image 160, the labeling step allocates identification numbers a, b, c to the objects 161, 162, 163 respectively as shown in FIG. 27.

After the labeling step, feature quantities (spot area, contrast, luminance gradient, etc.) are calculated for all the numbered pixel data (S240). Based on the feature quantities calculated in S240, it is determined whether the potentially defective regions are really defective (S250).

A labeling step performed on the inspection image shown in FIG. 27, as an example, designates the objects 161, 162, 163 potentially defective regions. In S240, feature quantities are calculated for each of the potentially defective regions. For example, the spot area, one of the feature quantities, is obtained by counting pixels where pixel data is 1.

With growing numbers of pixels in an image sensor image, the filtering steps and the identification number allocating step, required to enhance spot defects and stain defects in the conventional art described in the non-patent document, take an increasingly significant amount of time. This in turn means that the image sensor device needs an ever longer period of time for testing.

Furthermore, an original or scaled-down image is needed to calculate contrast, luminance gradient, and other feature quantities to determine whether the potentially defective regions are really defective. These images require memory where they are stored, which adds to circuit complexity.

Circuit complexity increases also if the conventional image processing method is implemented in hardware, for example, in the DSP section of the image sensor device or module or in a dedicated image processing device, because the conventional art described in the non-patent document involves repeated filtering to detect spot defects and stain defects.

These two problems (1. extended test time on the image sensor device; 2. increased circuit complexity) occur not only when the conventional art described in the non-patent document is applied to the inspection of an image sensor image. The same problems also occur when the art is applied to the inspection of a general digital image for defective regions.

The conventional art described in the non-patent document, if used to inspect a general digital image for any defective regions, will face the two problems: 1. It takes an extended period of time to determine if the image contains any defective regions. 2. Circuit complexity increases.

SUMMARY OF THE INVENTION

The present invention has an objective to provide a defect detecting device having small circuitry, but still being capable of quickly determining whether there is a defective region in a digital image, and also to provide an associated image sensor device, image sensor module, image processing device, digital image quality tester, defect detecting method, defect detecting computer program, and computer-readable storage medium.

A defect detecting device of the present invention, to achieve the objective, is a defect detecting device which, in a digital image, detects a defective region where pixel data changes non-uniformly when compared with surrounding regions, the device including: a block generating section dividing an inspection image in which a defective region will be detected into a plurality of blocks; and an intra-block sum calculating section calculating an intra-block sum for each of the blocks generated by the block generating section, the intra-block sum being a sum of pixel data for pixels in that block, wherein the intra-block sum is fed to a defective region presence determining section determining whether there exists a defective region by determining through statistical processing whether the intra-block sums have an outlier.

According to the invention, the defective region presence determining section determines whether there exists a defective region through statistical processing on the basis of the intra-block sum, a sum of pixel data for pixels in that block, for each of the blocks generated by the block generating section.

The "defective region" here refers to a spot defect, stain defect, or like defect which occurs in a digital image obtained from an image sensor device or a digital image produced by a digital image display device, such as a liquid crystal display. The "statistical processing" refers to an outlier detection in a common statistical analysis.

In the present invention, the image dividing lowers the data size needed to determine whether there exists a defective region. It is quickly determined whether there exists a defective region.

The intra-block sum used by the defective region presence determining section to determine whether there exists a defective region is obtainable without the inspection image or its scaled-down image being stored in memory. This enables hardware implementation of the defect detecting device of the present invention using small circuitry.

The digital image quality tester of the present invention, to achieve the objective, is a digital image quality tester externally connected to a defect detecting device which, in a digital image, detects a defective region where pixel data changes non-uniformly when compared with surrounding regions, the device including: a block generating section dividing an inspection image in which a defective region will be detected into a plurality of blocks; and an intra-block sum calculating section calculating an intra-block sum for each of the blocks generated by the block generating section, the intra-block sum being a sum of pixel data for pixels in that block, the tester including a defective region presence determining section determining whether there exists a defective region by determining through statistical processing of the intra-block sums fed from the intra-block sum calculating section whether the intra-block sums have an outlier.

According to the invention, the defective region presence determining section determines whether there exists a defective region through statistical processing on the basis of the intra-block sum, a sum of pixel data for pixels in that block, for each of the blocks generated by the block generating section.

In the present invention, the image dividing lowers the data size needed to determine whether there exists a defective region. It is quickly determined whether there exists a defective region.

The intra-block sum used by the defective region presence determining section to determine whether there exists a defective region is obtainable without the inspection image or its scaled-down image being stored in memory. This enables hardware implementation of the defect detecting device of the present invention using small circuitry.

A defect detecting device of the present invention, to achieve the objective, is a defect detecting device which, in a digital image, detects a defective region where pixel data changes non-uniformly when compared with surrounding regions, the device including a filtering section enhancing the defective region in an inspection image in which the defective region will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

In conventional art, the detection of a defective region is preceded by shading removal, noise component removal, and edge detection so as to enhance the defective region. These processes however involve repeated filtering. The conventional image processing, when implemented, takes a long time to determine whether there exists a defective region and requires large hardware circuitry.

In contrast, according to the invention, the n×m Laplacian filter is a highpass filter from which a second order derivative is obtained. The filter can therefore detect higher order edges than shading and remove the shading.

The n×m Laplacian filter is composed of nine (n/3)×(m/3) blocks. The pixel data is integrated in each (n/3)×(m/3) block. Noise is thereby removed.

The shading removal, noise reduction, and edge detection, which were conventionally carried out by means of repeated filtering, can be simultaneously performed using the n×m Laplacian filter. Therefore, the device determines whether there exists a defective region quickly and using small circuitry.

A defect detecting method of the present invention, to achieve the objective, is a method of detecting, in a digital image, a defective region where pixel data changes non-uniformly when compared with surrounding regions, the method including: the block generating step of dividing an inspection image in which a defective region will be detected into a plurality of blocks; the intra-block sum calculating step of calculating an intra-block sum for each of the blocks generated in the block generating step, the intra-block sum being a sum of pixel data for pixels in that block; and the defective region presence determining step of determining whether there exists a defective region by determining through statistical processing whether the intra-block sums have an outlier.

Another defect detecting method of the present invention, to achieve the objective, is a method of detecting, in a digital image, a defective region where pixel data changes non-uniformly when compared with surrounding regions, the method including the filtering step of enhancing the defective region in an inspection image in which the defective region will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

According to the invention, the steps realize similar processes to those realized by the defect detecting device of the present invention. The same functions and effects are obtained as the defect detecting device of the present invention.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 4 shows an example structure of a 9×9 Laplacian filter used in the defect detecting device in FIG. 1.

FIG. 5 shows a formula embodied in the 9×9 Laplacian filter in FIG. 4.

FIGS. 6(a) and 6(b) show an example structure of the first filter and the second filter respectively, which implement the 9×9 Laplacian filtering depicted in FIG. 4 in two stages.

FIG. 7 shows formulas embodied in the first and second filters in FIG. 6.

FIG. 9 shows a formula embodied in an intra-block sum calculating section in the defect detecting device in FIG. 1 to obtain an intra-block sum.

FIG. 24(a) shows a smoothing filter, as an example. FIG. 24(b) shows a Laplacian filter, as an example.

FIG. 25 shows a formula embodied in the filters in FIG. 24(a) and FIG. 24(b).

DESCRIPTION OF THE EMBODIMENTS

1. Device Basic Structure

Figure 1:
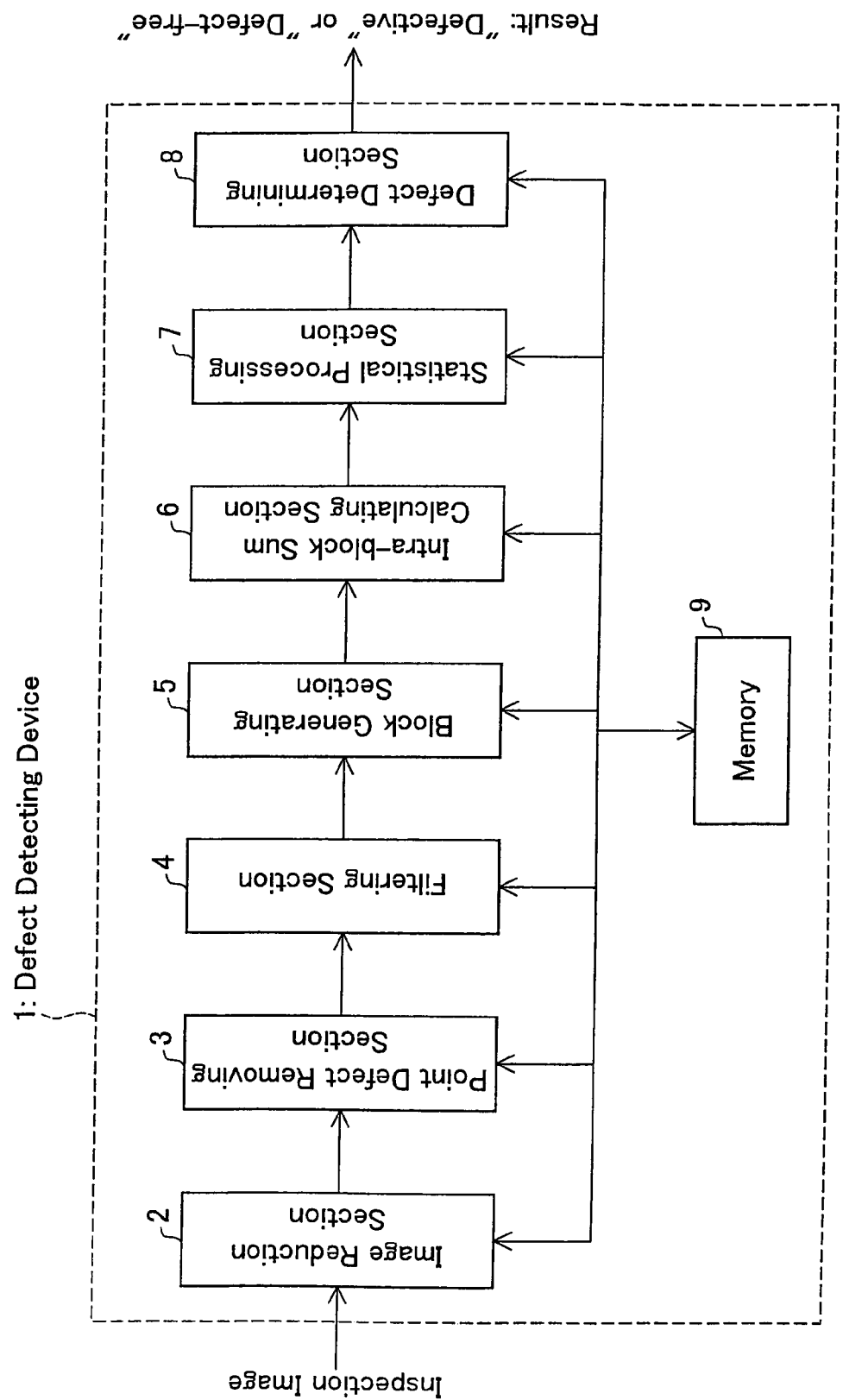
FIG. 1 is a block diagram illustrating the structure of an embodiment of the defect detecting device of the present invention.

An embodiment of the defect detecting device of the present invention will be described in reference to FIG. 1. A defect detecting device 1 of the present embodiment, as shown in FIG. 1, includes an image reduction section (image reduction means) 2, a point defect removing section (point defect removing means) 3, a filtering section (filtering means) 4, a block generating section (block generating means) 5, an intra-block sum calculating section (intra-block sum calculating means) 6, a statistical processing section (defective region presence determining means) 7, a defect determining section (defective region presence determining means) 8, and a memory 9.

The image reduction section 2 reduces the inspection image in both vertical and horizontal dimensions. The downscaling reduces the data size of the inspection image and makes spot defects and stain defects in the inspection image more prominent.

The point defect removing section 3 removes point defects from the inspection image with, for example, a point defect removing filter. The point defect removing filter was explained earlier in detail.

The image reduction section 2 and the point defect removing section 3 are not necessarily located inside the defect detecting device 1 and may be located in a device outside the defect detecting device 1. For example, either the image reduction section 2 or the point defect removing section 3, or both, may be provided in an image sensor device or a digital image quality tester outside the defect detecting device 1.

The filtering section 4 removes shading, reduces noise, and detects the edges of spot defects with an n×m Laplacian filter (details will be given later). The section 4 is one of the features of the defect detecting device 1. The processing performed by the filtering section 4 will be described later in detail.

The block generating section 5 divides the inspection image into a plurality of blocks which may resemble a mesh. The section 5 is another feature of the defect detecting device 1. The block may be a square or a rectangle. It can even have any shape so long as all the blocks has the same area. It will be detailed later how the block dimensions are determined.

The intra-block sum calculating section 6 calculates an intra-block sum for each block created by the block generating section 5. The intra-block sum is a sum of pixel data of all pixels in a block.

The statistical processing section 7 performs statistical processing of the intra-block sums calculated by the intra-block sum calculating section 6 as a preparation for the detection of a block containing a spot defect or a stain defect. If a block contains a spot defect, a stain defect, or another like defect, the intra-block sum of that block shows a statistical outlier. To exploit this, the statistical processing section 7 performs the statistical processing to obtain a maximum value, an average value, and a standard deviation of the intra-block sums calculated for the blocks.

The defect determining section 8 determines whether the maximum intra-block sum is an outlier, to determine whether the inspection image itself has satisfactory quality. The result is output externally. The outlier detection is performed based on equation (1):

$$\text{Rating (Maximum)} = (\text{Maximum} - \text{Average}/\text{Standard Deviation} \geq \text{Threshold} \quad (1)$$

where the maximum value, the average value, and the standard deviation are those obtained by the statistical processing section 7 from the intra-block sums. It will be detailed later how the defect determining section 8 determines a threshold.

The defect determining section 8 may also determine whether each block created by the block generating section 5 contains a spot defect or a stain defect. In that case, the defect determining section 8 does so using equation (2).

$$\text{Rating} = (\text{Intra-block Sum for a Block} - \text{Average})/\text{Standard Deviation} \geq \text{Threshold} \quad (2)$$

where the average value and the standard deviation are those obtained by the statistical processing section 7 from the intra-block sums. It will be detailed later how the threshold is determined.

The statistical processing section 7 and the defect determining section 8 are not necessarily located inside the defect detecting device 1 and may be located in a device outside the defect detecting device 1. For example, either the statistical processing section 7 and the defect determining section 8, or both, may be provided in an image sensor device or a digital image quality tester outside the defect detecting device 1.

The memory 9 contains filters, parameters, and results of computation which are needed in various processing in the defect detecting device 1. The memory 9 contains, for example, the n×m Laplacian filter used by the filtering section 4, the intra-block sums calculated by the intra-block sum calculating section 6, the average value of the intra-block sums given by the statistical processing section 7, and results of defect determination performed by the defect determining section 8.

With this configuration, the defect detecting device 1 detects spot defects and stain defects in the inspection image to determine whether the inspection image has satisfactory quality. The defect detecting device 1 of the present embodiment has two major features: 1. the filtering section 4 simultaneously removes shading, reduces noise, and detects the edges of spot defects using the n×m Laplacian filter; 2. the block generating section 5 divides the inspection image into a plurality of blocks which may resemble a mesh.

Conventional art involves repeated filtering in the defect enhancement process, which leads to increased test time on the image sensor device. The defect detecting device 1 of the present embodiment addresses that problem by simultaneously removing shading, reducing noise, and detecting the edges of spot defects using the n×m Laplacian filter. The device 1 hence reduces computation required to determine whether the inspection image has satisfactory quality, which in turn makes the test time much shorter.

The conventional problem of increased test time is also addressed in the defect detecting device 1 of the present embodiment in another way: the block generating section 5 divides the inspection image into a plurality of blocks which may resemble a mesh. The image dividing lowers the data size needed to determine whether the inspection image has satisfactory quality, which in turn also makes the test time much shorter.

Neither the filtering section 4 nor the block generating section 5, which are features of the defect detecting device 1 of the present embodiment, needs memory to store an original image or a scaled-down image. Therefore, the defect detecting device 1 of the present embodiment needs less memory capacity, reducing circuit complexity.

Noteworthy here is that the defect detecting device 1 of the present embodiment simultaneously removes shading, reduces noise, and detects the edges of spot defects using the n×m Laplacian filter. Being configured this way, the defect detecting device 1 of the present embodiment greatly reduces the repetition of filtering, thus circuit complexity, when compared to conventional devices.

2. Process Flow Outline

Figure 2:
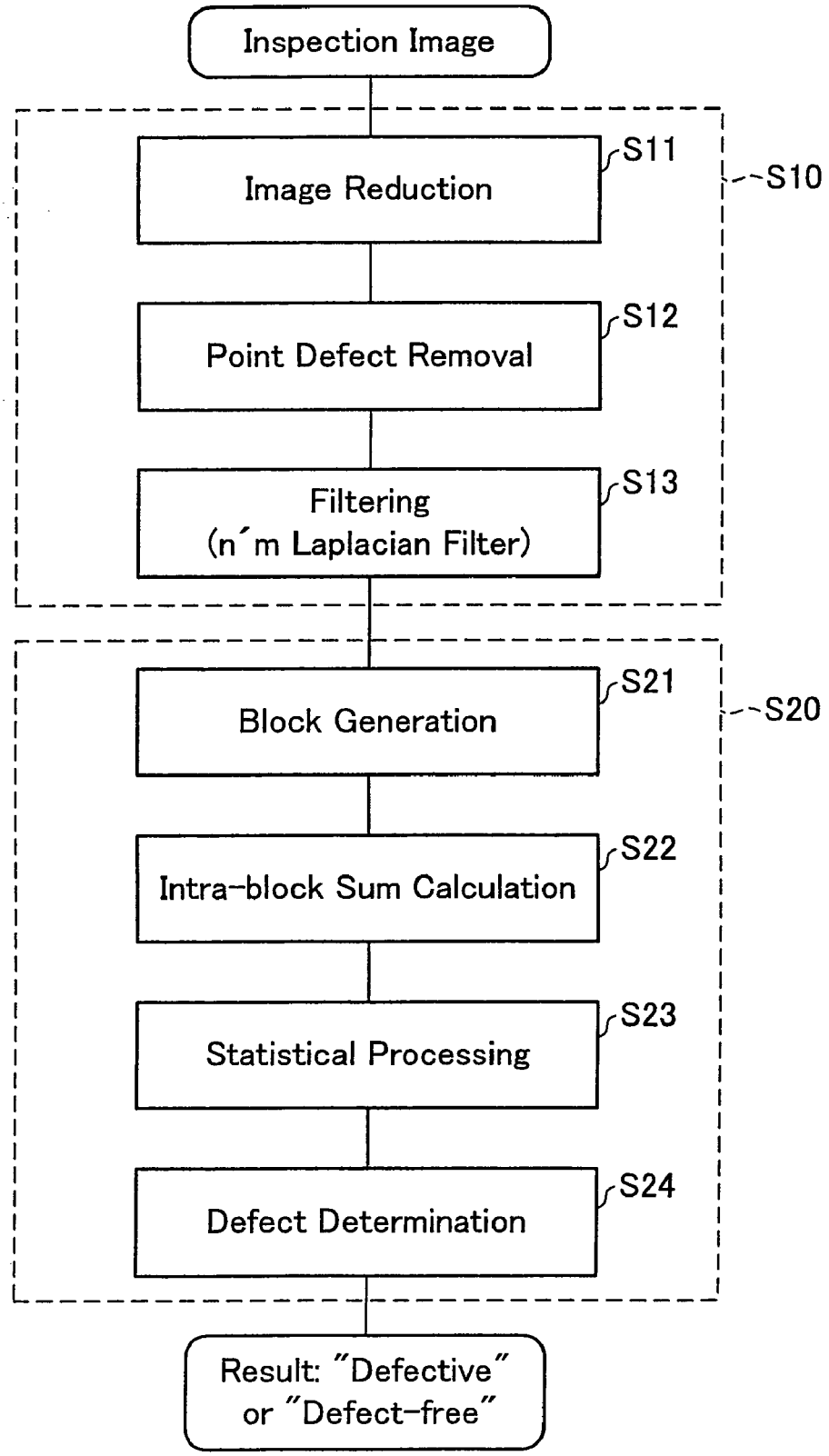
FIG. 2 is a flow chart illustrating an embodiment of the defect detecting method of the present invention.

Referring to FIG. 2, the following will describe an operation flow in the defect detecting method implemented by the defect detecting device 1 of the present embodiment.

As shown in FIG. 2, the defect detecting method of the present embodiment includes two major processes: a defect enhancement process (S10) and a defective region extraction process (S20). More specifically, the defect enhancement process (S10) is made up of an image reduction step (S11) implemented by the image reduction section 2, a point defect removing step (S12) implemented by the point defect removing section 3, and a filtering step (S13) implemented by the filtering section 4. The defective region extraction process (S20) is made up of a block generating step (S21) implemented by the block generating section 5, an intra-block sum calculating step (S22) implemented by the intra-block sum calculating section 6, a statistical processing step (S23) implemented by the statistical processing section 7, and a defect determining step (S24) implemented by the defect determining section 8.

Among these process/steps involved in the defect detecting method, the filtering in S13 and the image division in S21 are the major features of the defect detecting method of the present embodiment. Now, the filtering and the image division are described in detail.

3. Filtering in Detail

The filtering in S13 is, as mentioned earlier, implemented by the filtering section 4. Shading is removed, noise is reduced, and the edges of spot defects are detected, all simultaneously, using the n×m Laplacian filter.

Figure 3:
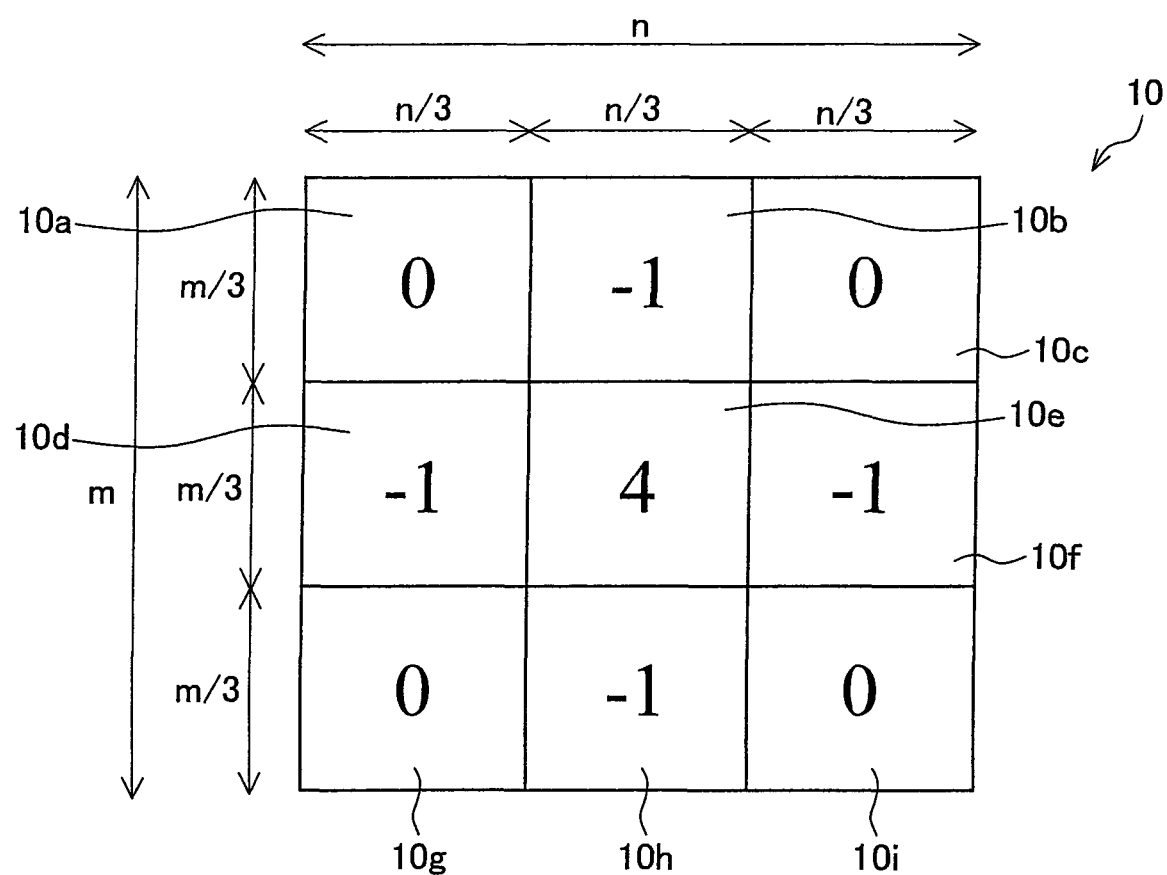
FIG. 3 shows an example structure of an n×m Laplacian filter used in the defect detecting device in FIG. 1.

First, the n×m Laplacian filter will be described. The n×m Laplacian filter is a highpass filter from which a second order derivative is obtained, where n and m represent the number of pixels and are multiples of 3. Referring to FIG. 3, a n×m Laplacian filter 10 is composed of nine (n/3)×(m/3) blocks (10a to 10i).

In the n×m Laplacian filter 10 shown in FIG. 3, the central block 10e has a weight coefficient of 4, and its blocks 10b, 10d, 10f, 10h have a weight coefficient of −1. The weight coefficients may have other values. The point is that the weight coefficients of the central block 10e and its eight surrounding blocks (10a, 10b, 10c, 10d, 10f, 10g, 10h, 10i) adds up to 0. It is preferable if the weight coefficients of the eight surrounding blocks have equal values or are horizontally or vertically symmetrical.

In the n×m Laplacian filter 10 shown in FIG. 3, the block 10a located on the upper left corner, the block 10c located on the upper right corner, the block 10g located on the lower left corner, and the block 10i located on the lower right corner have a weight coefficient of 0.

Now, assuming that n=9 and m=9, the structure of the n×m Laplacian filter (9×9 Laplacian filter) will be further described in reference to FIG. 4. Referring to the figure, a 9×9 Laplacian filter 11 is composed of nine 3×3 blocks (11a to 11i).

The nine weight coefficients in the central block 11e in the 9×9 Laplacian filter 11 are all set to 4, those in the adjacent blocks 11b, 11d, 11f, 11h to −1, and those in the remaining blocks 11a, 11c, 11g, 11i to 0.

FIG. 5 shows a formula embodied in the 9×9 Laplacian filter 11. A 9×9 filter, like a 9×9 Laplacian filter, is not applicable to a region where no pixels exist above, below, and to the right and left of the region within a distance that is equivalent to 4 pixels, like near the end of the image to be filtered. So, in filtering, attention should be paid to the initial and last values in an image scan loop.

The n×m Laplacian filter is capable of simultaneously removing shading, reducing noise, and detecting the edges of spot defects for the following reasons.

Reason 1: The n×m Laplacian filter is highpass filter from which a second order derivative is obtained. The filter can therefore detect higher order edges than shading and remove the shading.

Reason 2: The n×m Laplacian filter is composed of nine (n/3)×(m/3) blocks. The pixel data is integrated in each (n/3)×(m/3) block. Noise is thereby removed.

Experience indicates that a Laplacian filter larger than 3×3 has better defect detection sensitivity for spot defects, stain defects, and defects of similar sizes. This is especially true with spot defects with small contrast difference.

4. Variation of n×m Laplacian Filter

Applying the n×m Laplacian filter to a target pixel involves multiplication and addition of pixel data for the target pixel and its surrounding pixels (n×m pixels in all). For example, applying a 9×9 Laplacian filter to an inspection image containing N pixels requires a total of 81N sets of multiplications and additions.

In the present embodiment, one multiplication and one addition are counted as one set of multiplication and addition. Strictly speaking, however, those pixels whose filter coefficient is set to 0 requires no multiplication or addition at all; no set of multiplication and addition is involved. Those with a "1" filter coefficient requires one addition, but no multiplication. This is not counted as one set of multiplication and addition.

Considering these cases, the use of the 9×9 filter in FIG. 4 involves a total of 45N sets of multiplications and additions.

The multiplications and additions required in the application of the n×m Laplacian filter can be reduced by two-staged filter computation using two types of filters. For example, the multiplications and additions required by the 9×9 Laplacian filter can be reduced by the use of a first filter 12 shown in FIG. 6(a) and a second filter 13 shown in FIG. 6(b).

The first filter 12 is a 3×3 filter as shown in FIG. 6(a) with all the nine weight coefficients of the filter being set to 1. The second filter 13 is a 9×9 filter made up of nine 3×3 blocks (13a to 13i).

In the central block 13e in the second filter 13, only the central weight coefficient is 4. The surrounding eight weight coefficients in the block 13e are all 0. In each of the adjacent blocks 13b, 13d, 13f, 13h to the block 13e, only the central weight coefficient is −1. Its eight surrounding weight coefficients are all 0. In the remaining blocks 13a, 13c, 13g, 13i, all the nine weight coefficients are 0.

The same multiplications and additions as the 9×9 Laplacian filter can be performed by 2-staged filter computation using the first and second filters 12, 13 configured as above. The first filter 12 and the second filter 13 each performs multiplications and additions for nine pixels twice. The two-staged filtering therefore involves a total of 18N sets of multiplications and additions, which is a reduction of computation required by the 9×9 Laplacian filter. The formulas embodied in the first filter 12 and the second filter 13 are shown in FIG. 7.

The computation required by an n×m Laplacian filter can be reduced similarly by the use of two types of filters like the first filter 12 and the second filter 13.

The first filter is a (n/3)×(m/3) filter, and all of its weight coefficients are the same value, e.g., 1. The second filter is a (n/3)×(m/3) filter made of nine blocks. In the second filter, the weight coefficients are set up so that the sum of the central weight coefficient in the central block (center one of the nine blocks) and the central weight coefficients in the eight blocks surrounding the central block is 0. All the other weight coefficients are 0. it is preferable if the central weight coefficients of the eight blocks around the central block have equal values or are horizontally or vertically symmetrical.

Note however that in the case that n=6 and m=6, the first filter is a 2×2 filter, whereas the second filter is a 6×6 filter. There is no central weight coefficient in a block.

In that case, the weight coefficients in the second filter are set up so that the sum of the weight coefficient closest to the center of the central block and the weight coefficient closest to the center of each of the eight blocks surrounding the central block are 0. All the other weight coefficients are 0.

5. Image Division in Detail

Next, the image division (see S21 in FIG. 2) as implemented by the block generating section 5 (FIG. 1) will be described.

Figure 8:
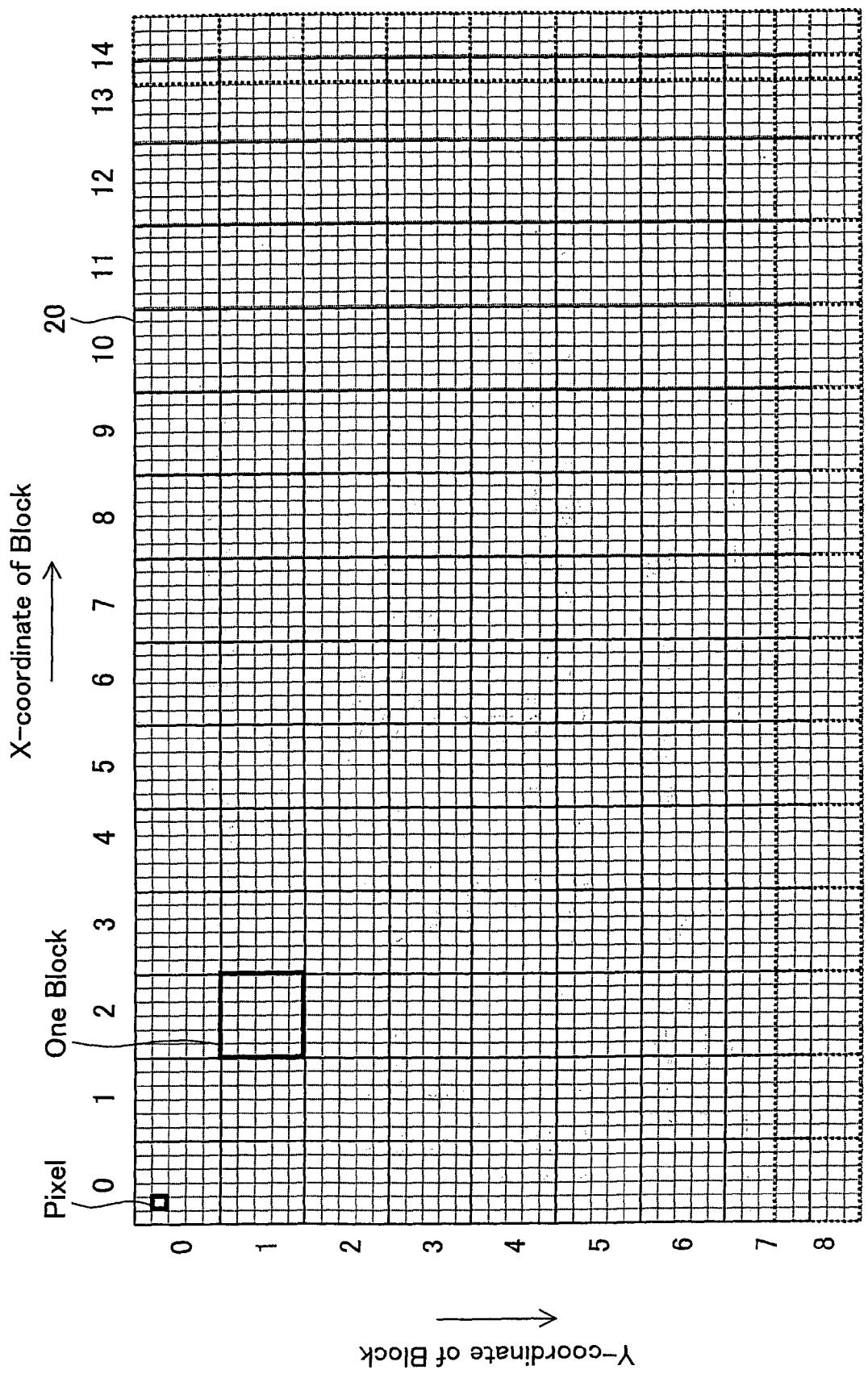
FIG. 8 shows an inspection image being divided into blocks by the defect detecting device in FIG. 1.

Assume, for example, that the inspection image 20 is 73 pixels wide and 43 pixels high, as shown in FIG. 8. The inspection image 20 can be divided, for example, into blocks each 5 pixels wide and 5 pixels high.

The blocks may be squares or rectangles, or assume any shape provided that they have the same area. If the inspection image is divided starting from the upper left corner, some pixels near the corners of the inspection image may end up being excluded from any blocks, depending on the dimensions of each block. In that case, the image may be divided into blocks as shown by broken lines in FIG. 8, so that the blocks fit the edges of the image. The division does not necessarily start from the upper left corner. The division only needs to involve all the pixels in the inspection image.

The block dimensions are specified to suitable values, considering the total number of pixels in the image, defect detection sensitivity, the effect of noise on the determination made by the defect determining section 8, the amount of computation, and other factors.

Large blocks eliminate the effect of noise on the determinations of the defect determining section 8, but results in poor detection sensitivity for spot and stain defects. In contrast, small blocks may catch noise and point defects which the point defect removing section 3 failed to remove, but shows good detection sensitivity for spot and stain defects. Considering these tradeoffs, the block dimensions are specified to suitable values. Table 1 lists the tradeoffs.

TABLE 1

Tradeoff between Defect Detection Sensitivity/Noise and Determinations

| Parameter | Block Dimensions | Smaller | Larger |
|---|---|---|---|
| Effect of Variation in Parameters on Determinations | Defect Detection Sensitivity | Higher | Lower |
| | Effect of Noise on Determinations | Larger | Smaller |
| | Computation in Defective Region Extraction | Larger | Smaller |

The block generating section 5 divides the inspection image into blocks on the basis of the specified block dimensions as above. The intra-block sum calculating section 6 calculates an intra-block sum for each divided block. FIG. 9 shows the formula used to calculate the intra-block sum.

Figure 10:
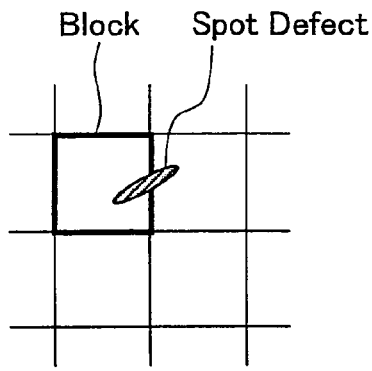
FIG. 10(a) shows a spot defect spreading across a block boundary.
FIG. 10(b) shows a part of an image divided into sequential, but partially overlapping blocks by the block generating section in FIG. 1.
Figure 10:
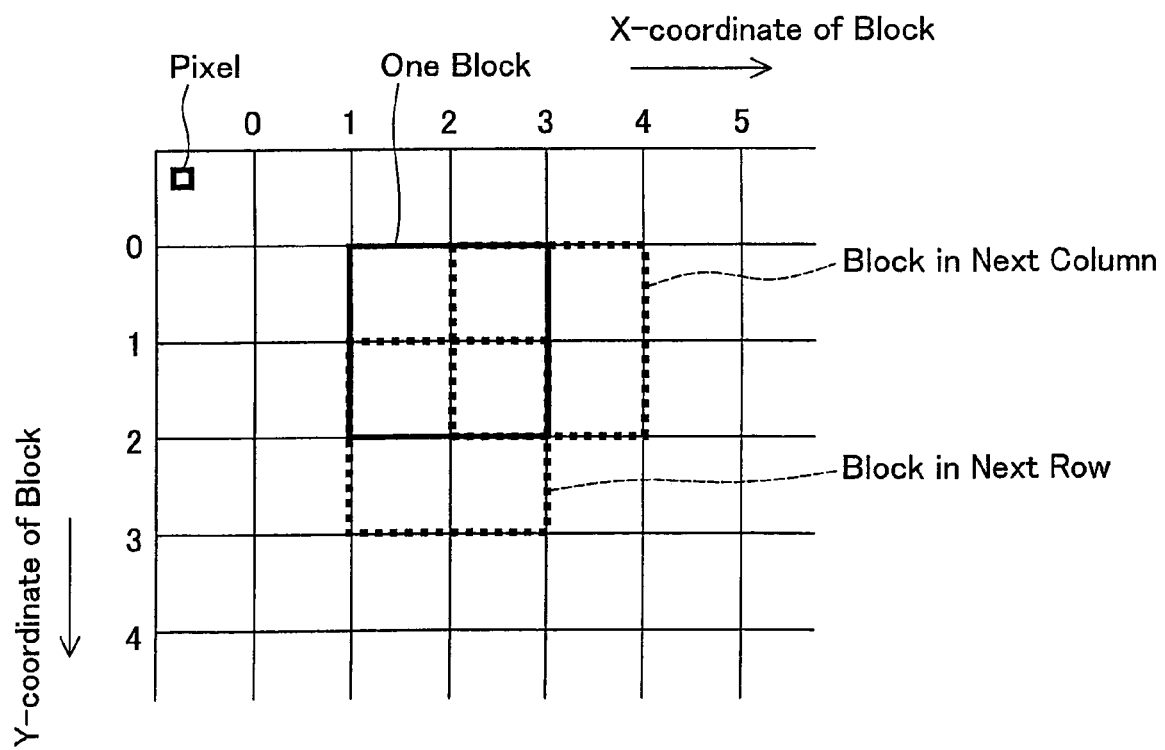

As shown in FIG. 10(a), a spot defect can occur spreading across a block boundary. In that case, the spot defect may affect both the intra-block sums of the adjacent two blocks, leading to poor defect detection sensitivity.

The poor sensitivity abates by designing blocks so that adjacent ones overlap each other as shown in FIG. 10(b). Specifically, sequential blocks are designed so that the current block overlaps a block in the next column or row. Such blocks contain the effect of the spot defect within single blocks; they are not allow the spot defect to affect the intra-block sums of two blocks.

The image division is preferable to a conventional labeling step for the following reasons. Conventional art requires many steps in binarization and noise removal prior to a labeling step. In addition, the binarization step in conventional art, depending on the threshold value used in the step, can designate the point defects and noise which were not sufficiently removed in the defect enhancement process, as well as actual defective regions, as possible spot defects and stain defects. It is thus difficult to determine the threshold value. Conventional art addresses the problem by removing concave/convex noise from a binary image through dilation/erosion; however, that process can also remove relatively small possible spot and stain defects.

In contrast, the image division of the present embodiment greatly reduces the amount of data to be processed, which enables high-speed defect determination. In addition, the image division, unlike the binarization step, quantitatively evaluates the probability of a defect from the intra-block sum across the image, without loss in the information on defect-free regions, and make a determination as to defects through comparison between defect-free regions and defective regions. The image division therefore is highly correlated with results of visual inspection of defective regions.

6. Defect Determination in Detail

Next will be described a defect determination implemented by the defect determining section 8 (FIG. 1). See S24 in FIG. 2. First, the defect determining section 8, as mentioned earlier, determines whether the maximum intra-block sum is an outlier with reference to a determination threshold. The following will describe a method for specifying the determination threshold.

Figure 11:
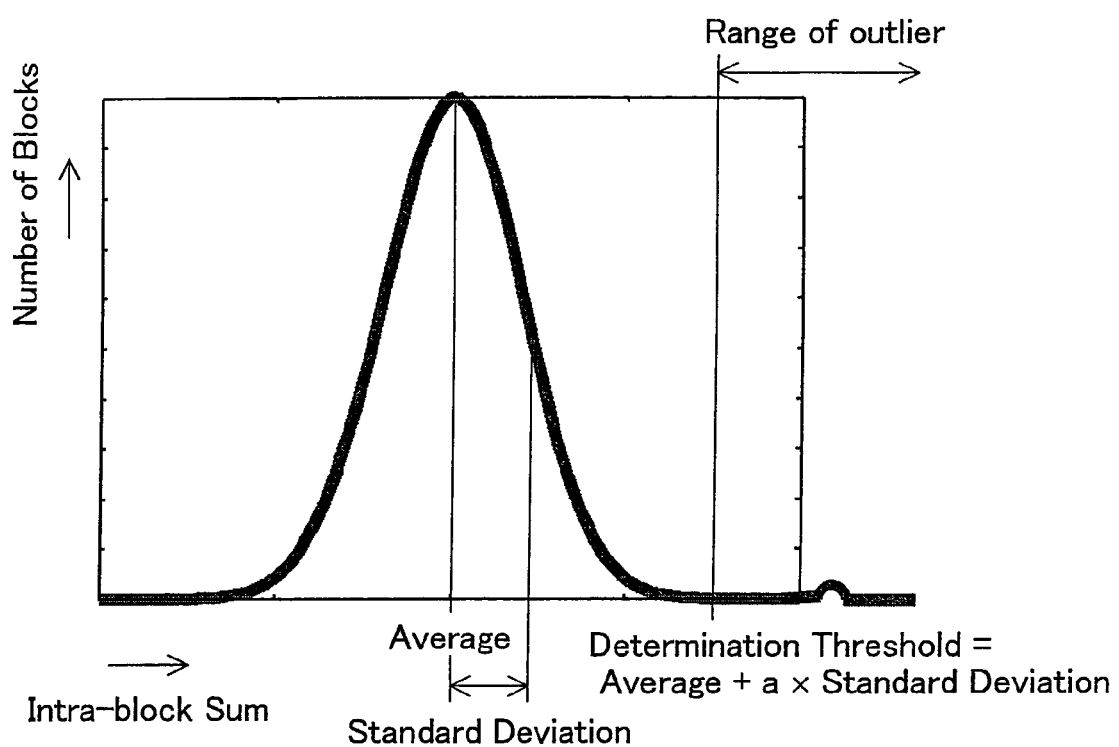
FIG. 11 is an example of a histogram representing the distribution of the intra-block sums calculated by an intra-block sum calculating section in the defect detecting device in FIG. 1.

FIG. 11 is an example of a histogram representing the distribution of the intra-block sums. In FIG. 11, the horizontal axis gives the intra-block sum, and the vertical axis gives the number of blocks. If the inspection image is one obtained from a good-quality image sensor device, noise, which could not removed in the defect enhancement process (S10) is dominant, and the intra-block sums approximate the normal distribution.

Accordingly, the statistical processing section 7 (see FIG. 1) calculates the average and standard deviation of the intra-block sums, and the defect determining section 8 specifies a determination threshold from the equation:

Threshold=Average+$a$×Standard Deviation ($a$ is a constant)

If there exists a larger intra-block sum than the determination threshold, the defect determining section 8 determines that the inspection image has a spot defect/stain defect and that the inspection image is defective.

The constant a may be determined from the following equation, after preparing one or more good-quality reference images and calculating intra-block sums for each image:

$a$=(Maximum Intra-block Sum−Average Intra-block Sum)/Standard Deviation of Intra-block Sums Alternatively, the Smirnov-Grubbs' outlier test may be used to determine the constant a from the number of data sets n and the critical region α (=0.01, for example). The Smirnov-Grubbs' outlier test is a method of examining sample data from the same parent population for a statistical outlier. Using the method, the threshold based on which it is determined whether the examined data contains an outlier is determined unambiguously by determining the significance level (or critical region; typically 0.01 or 0.05) and the number of sample data sets.

The value (rating) used in the defect determination is a normalized value with the standard deviation. The determination threshold is therefore not an absolute value, but a value determined considering a ratio (constant a) with respect to the standard deviation. Setting up the determination threshold in this manner enables defect determination which is not affected by irregularities in luminance between inspection images.

Figure 12:
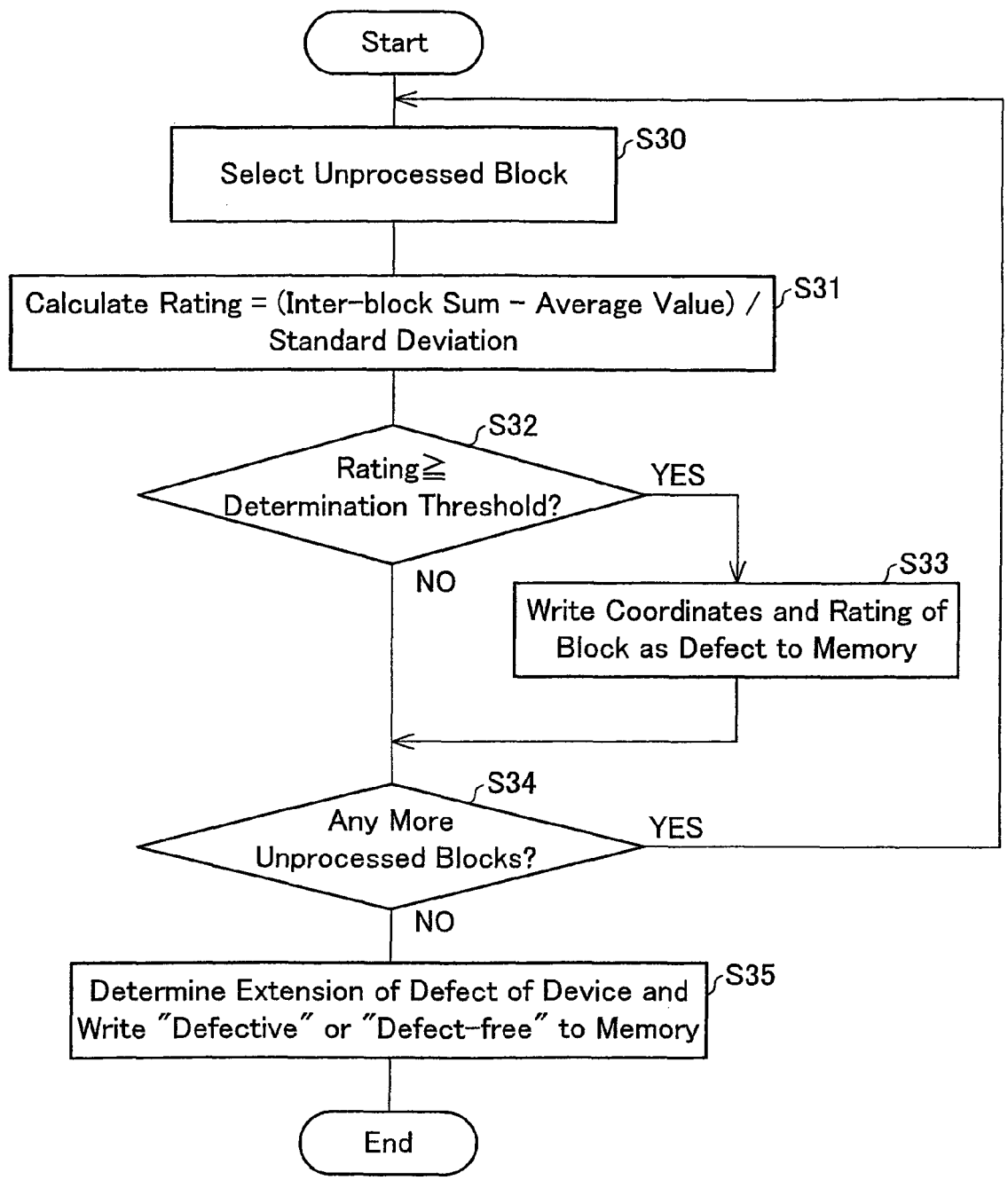
FIG. 12 is a flow chart illustrating a defect determining section in the defect detecting device in FIG. 1 determining one block after another whether the blocks, into which an inspection image is divided, contain a defect.

Next, the defect determination will be described in terms of its operation flow. FIG. 12 shows a flow of operation when a defect determination is made for each block generated from the inspection image.

First, the defect determining section 8 selects, from the inspection image, a block for which a defect determination is yet to be made (S30). A rating obtained for the selected block (S31). The rating is given by the equation:

Rating=(Intra-block Sum of Selected Block−Average)/Standard Deviation

The defect determining section 8 compares the rating with the determination threshold (S32). If the rating is more than or equal to the determination threshold, the section 8 determines that the inspection image is defective and writes the coordinates and rating of the block to memory (S33).

In contrast, if the rating is less than the determination threshold, the defect determining section 8 determines that the inspection image is of good quality. The section then determines whether there is a block for which a defect determination is yet to be made (unprocessed block) (S34). If there seems to be an unprocessed block, the operation returns to S30.

If it is determined in S34 that there is no unprocessed block, information as to whether the inspection image has a defect is written to memory (S35). In S35, it may be determined whether the inspection image has satisfactory quality in accordance with whether the information was written to memory in S33. Alternatively, the rating written in S33 may be further examined to determine the quality ranking of the inspection image and write it to memory.

A specific description will be given as to the quality ranking of an inspection image. To determine the quality ranking, a plurality of references may be specified in accordance with the magnitude of the difference between the rating and the determination threshold. For example, three references, "large," "medium, and "small," may be set up for the magnitude of the difference between the rating and the determination threshold, and three corresponding references, "very defective," "defective," and "a little defective," for the inspection image quality ranking. Alternatively, more than one determination threshold may be specified to determine inspection image quality ranking.

Figure 13:
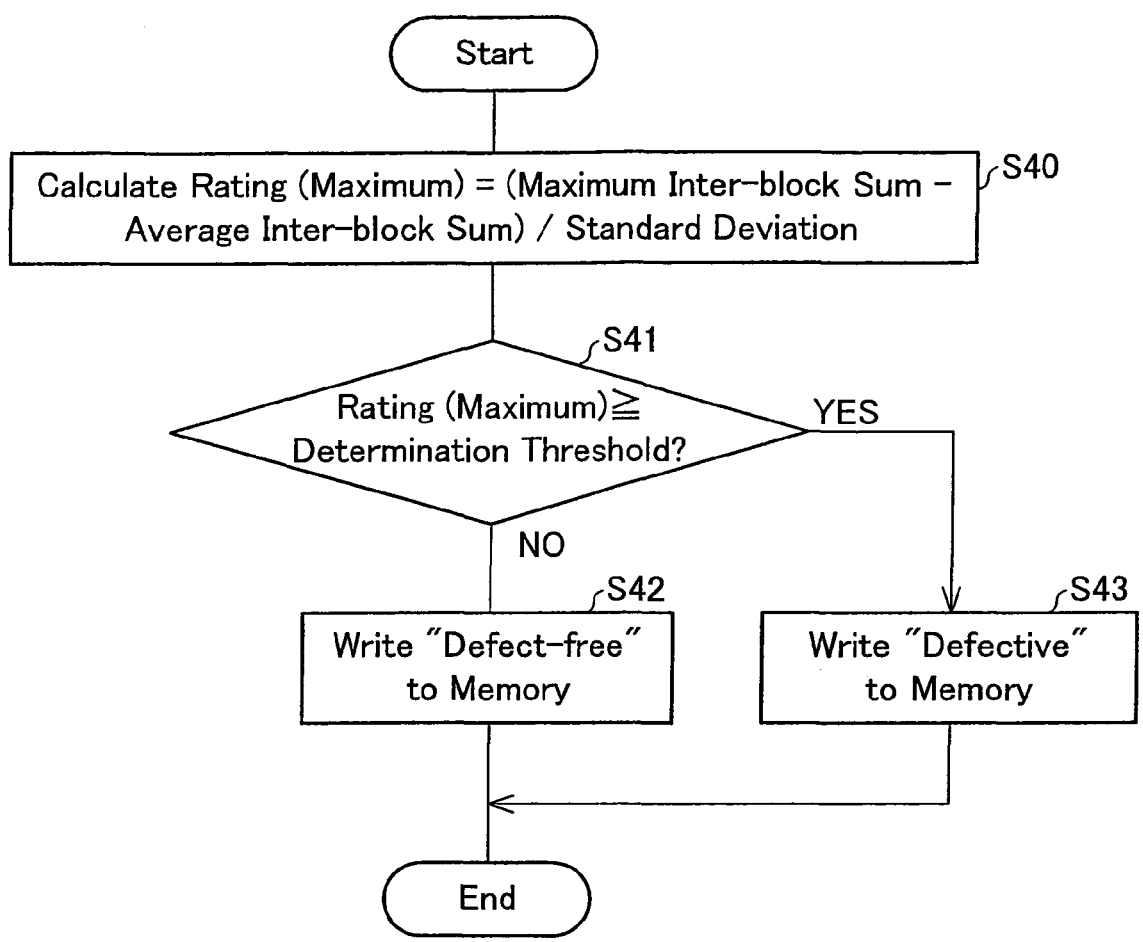
FIG. 13 is a flow chart illustrating a defect determining section in the defect detecting device in FIG. 1 making that determination on the basis of a maximum intra-block sum.

A defect determination is made as to each block generated from the inspection image as mentioned earlier. Alternatively, the defect determination may be made based on a maximum intra-block sum. A process flow in that case will be described in reference to FIG. 13.

First, the defect determining section 8 obtains a rating from the following equation (S40):

Rating=(Maximum Intra-block Sum−Average Intra-block Sum)/Standard Deviation

The defect determining section 8 then compares the magnitude of the rating obtained in S40 to that of the determination threshold (S41) and writes a determination to memory in S42 or S43.

7. Feasibility with Actual Image

Referring to an actual image, the following will describe the process in which the defect detecting device 1 configured as above detecting a spot defect.

Figure 14:
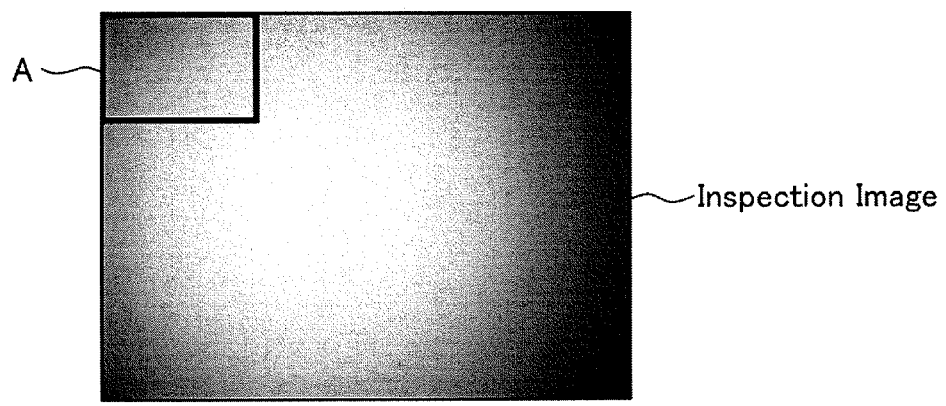
FIG. 14(a) shows an example inspection image.
FIG. 14(b) is a scale-up image of segment A in FIG. 14(a).
FIG. 14(c) is a graphical 3D representation of pixel data for segment A in FIG. 14(b).
Figure 14:
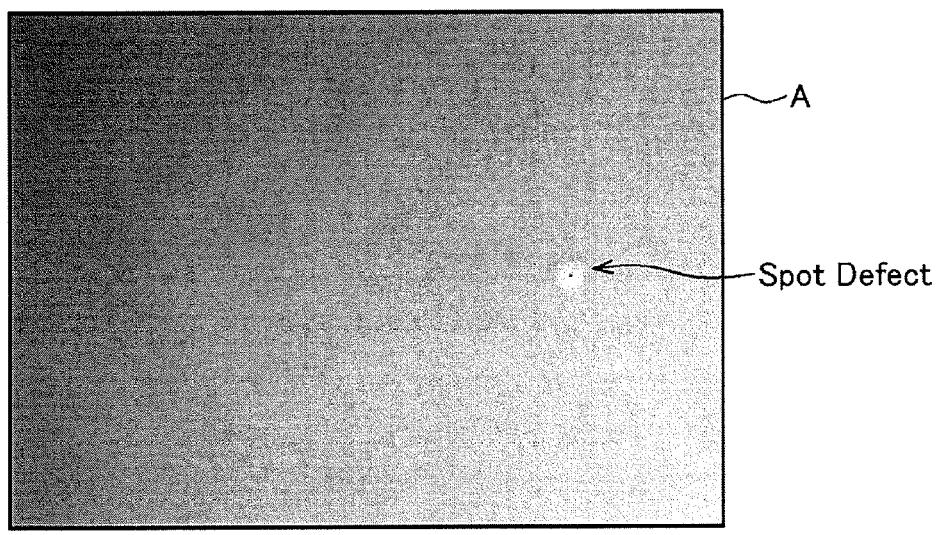
Figure 14:
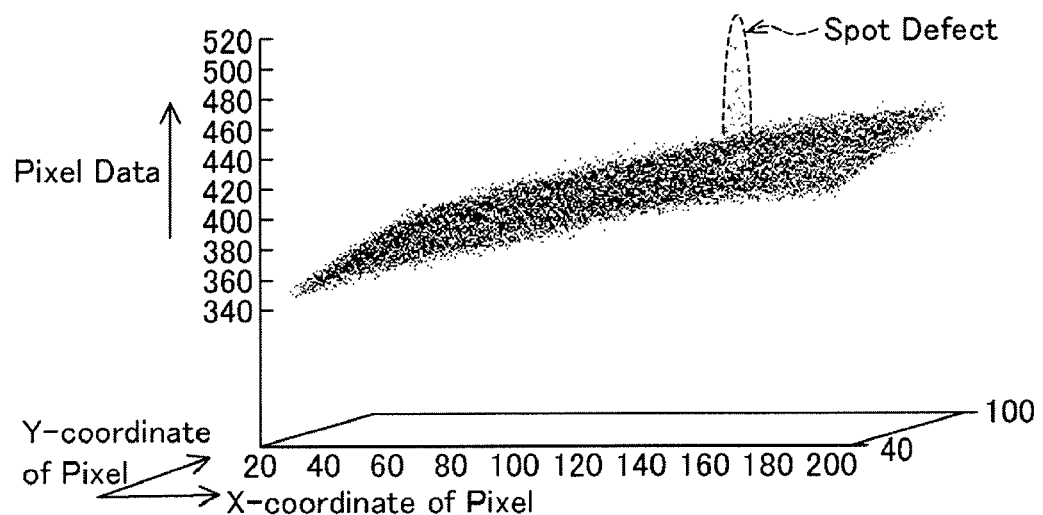

First, suppose that an inspection image shown in FIG. 14(a) is given. The image contains a spot defect in segment A. See FIG. 14(b) which is an enlarged image of segment A.

Pixel data in segment A in FIG. 14(b) is shown three dimensionally in the graph of FIG. 14(c). FIG. 14(c) depicts that the pixel data increases only where there occurs a spot defect.

Figure 15:
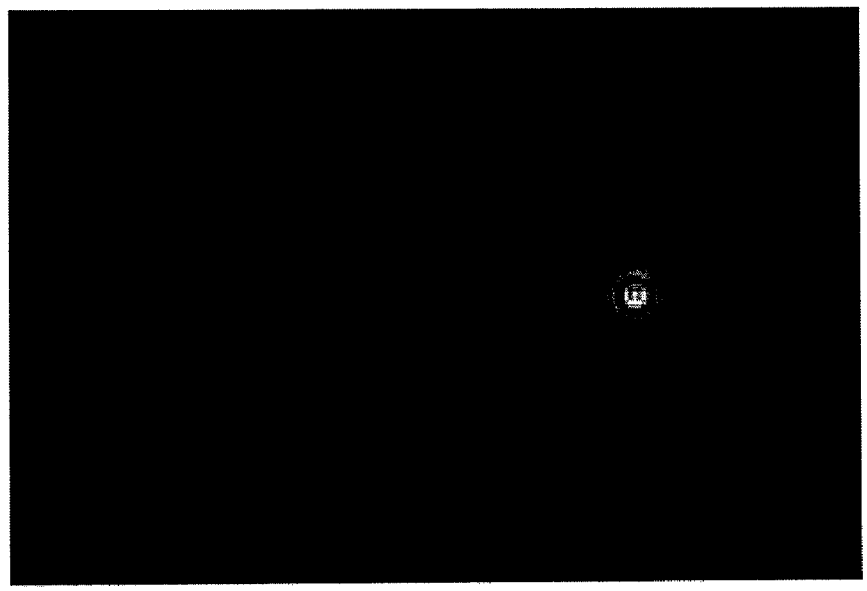
FIG. 15(a) shows the result of filtering performed on the image in FIG. 14(b) using a 9×9 Laplacian filter.
FIG. 15(b) is a graphical 3D representation of pixel data for the image in FIG. 15(a).
Figure 15:
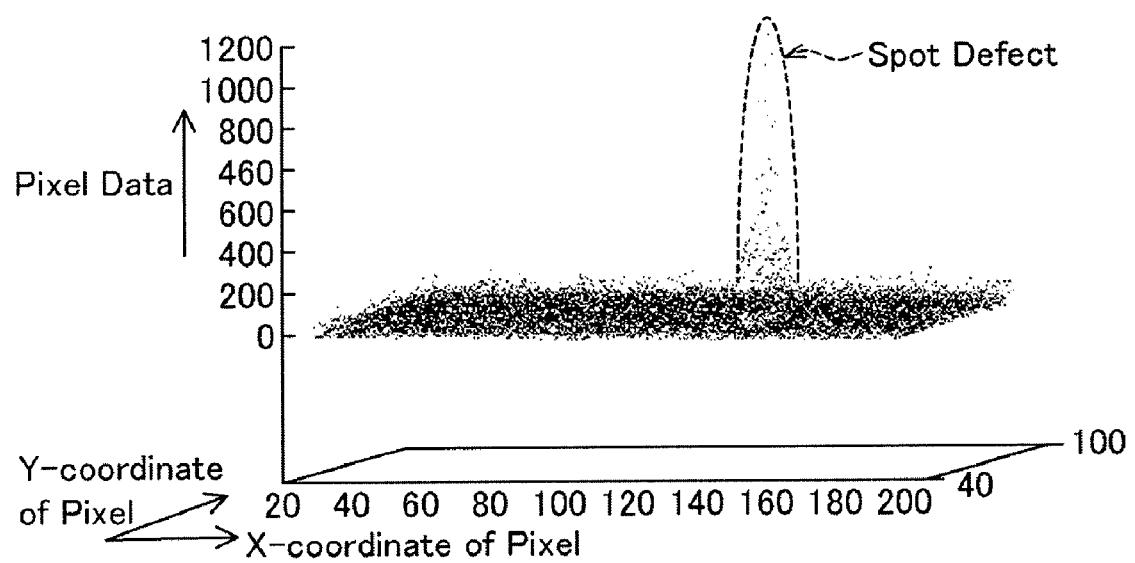

FIG. 15(a) shows an image obtained by subjecting the image in FIG. 14(b) to a 9×9 Laplacian filter. The pixel data of that filtered image is shown three dimensionally in the graph of FIG. 15(b). Comparing the FIG. 14(c) graph to the FIG. 15(b) graph, the pixel data in FIG. 15(b) is invariable except for the spot defect and shows the spot defect very distinctly standing out from the non-defective region. It is understood from this that the use of the 9×9 Laplacian filter has removed both shading and noise from the FIG. 14(b) image and detected the edges of a spot defect.

Figure 16:
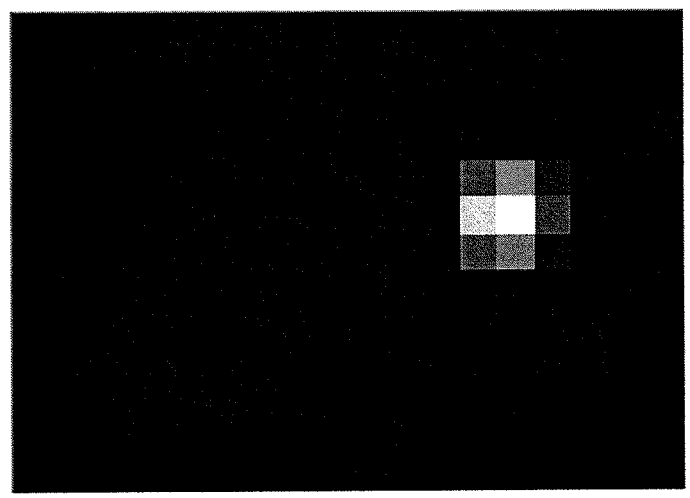
FIG. 16(a) shows calculated intra-block sums across the image in FIG. 15(a).
FIG. 16(b) is a graphical 3D representation of these intra-block sums.
FIG. 16(c) shows defective regions in the image.
Figure 16:
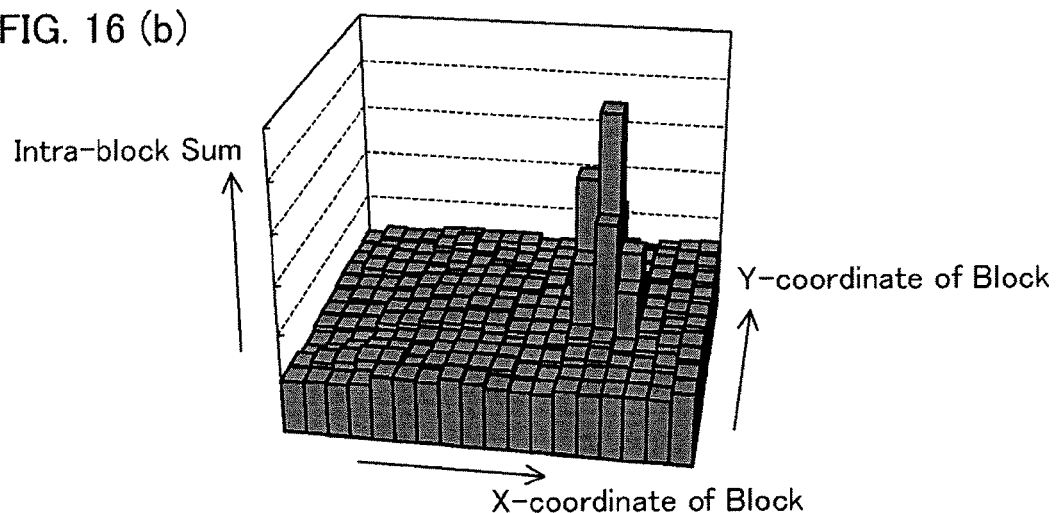
Figure 16:
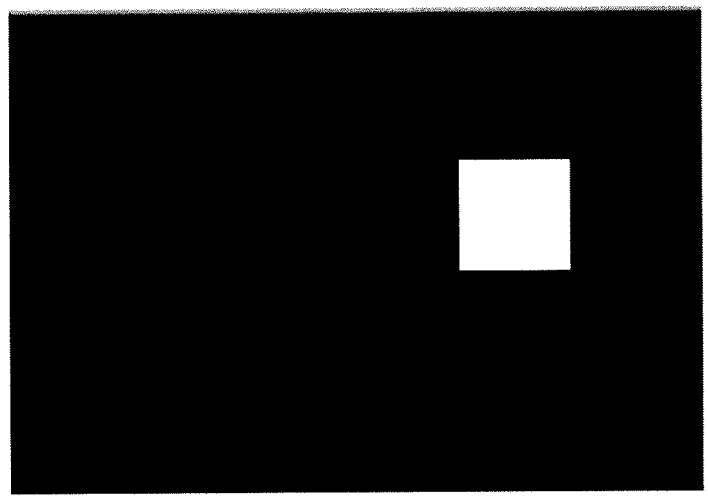

FIG. 16(a) shows an image obtained by dividing the FIG. 15(a) image into blocks and calculating an intra-block sum for each block. FIG. 16(b) shows a 3D graph in which the intra-block sums in the FIG. 16(a) image are plotted. As shown in FIG. 16(b), the intra-block sum is large in the spot defect when compared with the other regions. FIG. 16(c) is the final result; the defective region is extracted from the FIG. 16(b) image.

Figure 17:
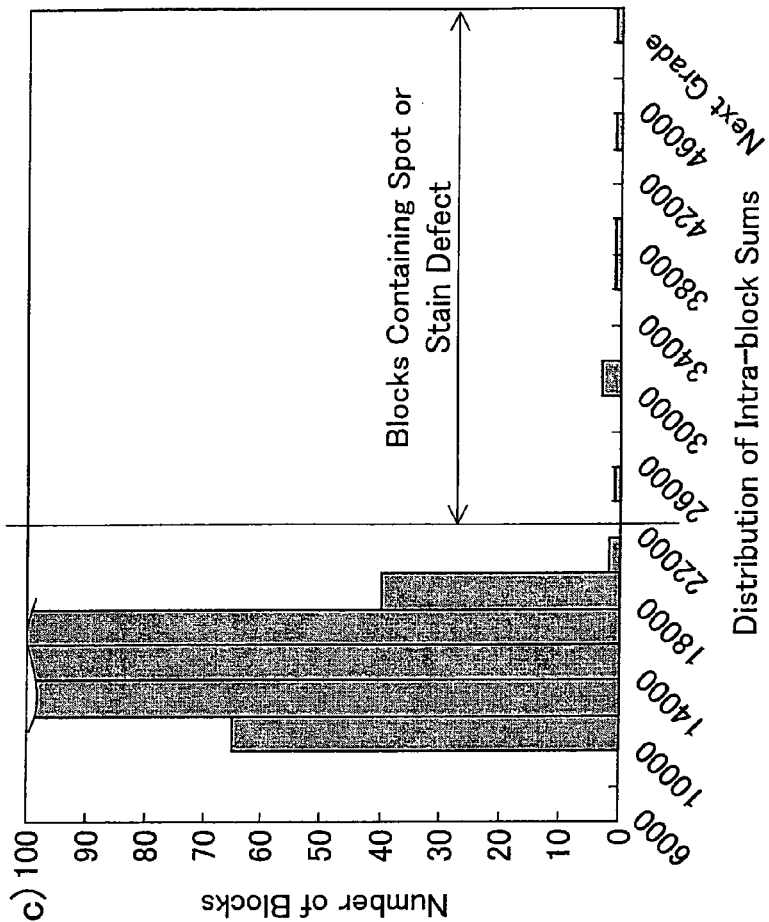
FIG. 17(a) is a histogram showing the distribution of the intra-block sums calculated from the inspection image in FIG. 14(a) with the defect detecting method of the present invention.
FIG. 17(b) shows the minimum, maximum, and average values, as well as the standard deviation, of the intra-block sum, which is a result of statistical processing of the histogram in FIG. 17(a).
FIG. 17(c) shows a threshold for defect determinations specified based on the statistical data shown in FIG. 17(b).

FIG. 17(a) is the distribution of the intra-block sums obtained from the FIG. 14(a) inspection image by the defect detecting method of the present embodiment. FIG. 17(b) shows the minimum, maximum, and average values, as well as the standard deviation, of the intra-block sum, which is a result of statistical processing of the histogram in FIG. 17(a). FIG. 17(c) shows a determination threshold as specified from the histogram in FIG. 17(a) and the result of the statistical processing in FIG. 17(b).

8. Implementation: Some Examples

Next will be described some example structures of the inspection system for an image sensor device incorporating the defect detecting device of the present embodiment.

Figure 18:
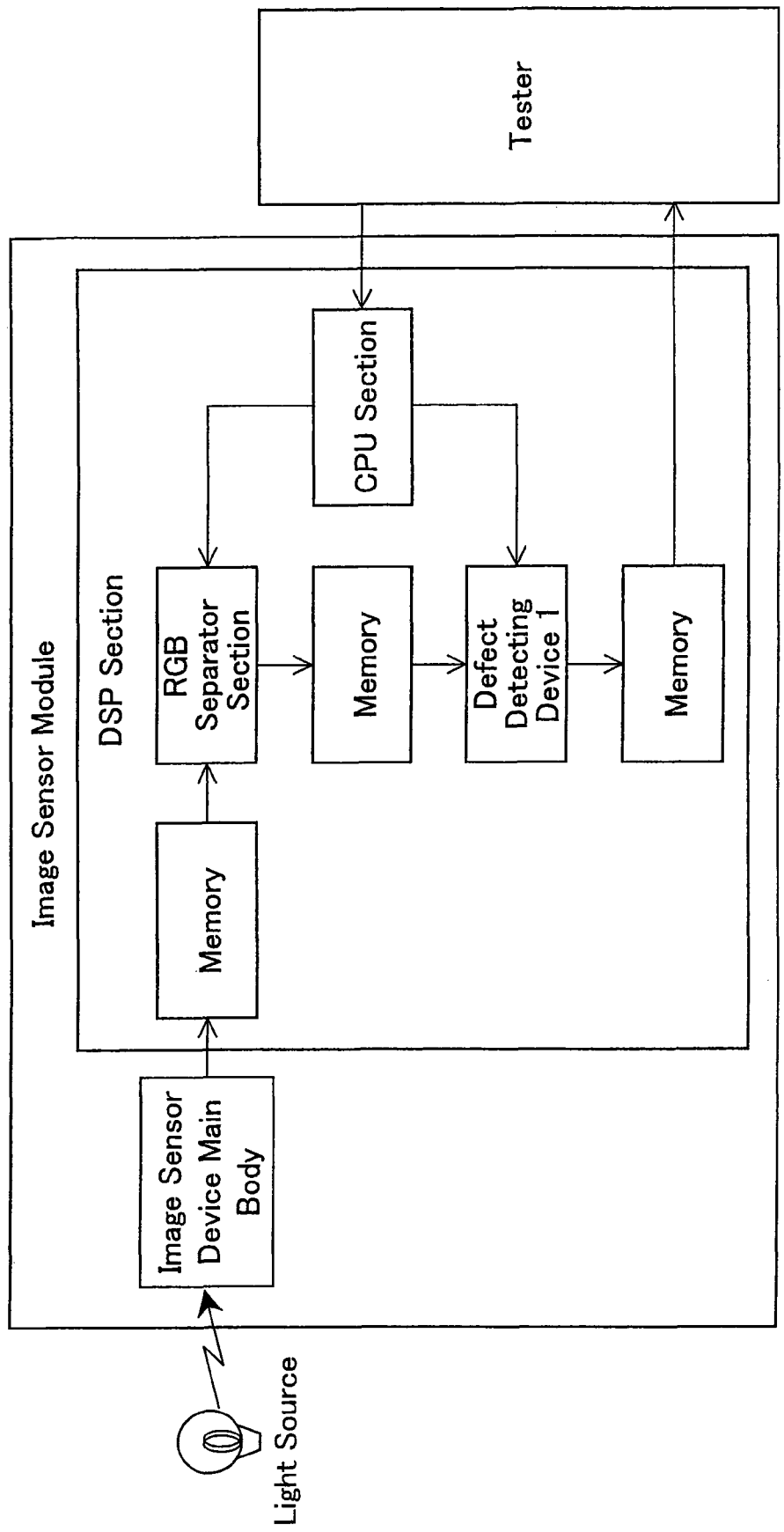
FIG. 18 illustrates an example structure of an inspection system built around an image sensor device which incorporates the defect detecting device in FIG. 1.

First, assume an inspection system containing an image sensor module and a tester (digital image quality tester) for the image sensor device as shown in FIG. 18. The module includes an image sensor device main body and a DSP section. The image sensor device main body receives light from a light source. The DSP section includes an RGB separator section, a CPU section, and a plurality of memories. The members making up the DSP section are no different from the members making up a DSP section in a common image sensor module; no detailed description is therefore given to those members.

In the example structure of the inspection system shown in FIG. 18, the defect detecting device 1 of the present embodiment is provided inside the DSP section. The defect detecting device 1 of the present embodiment can be mounted inside the image sensor module in this manner. Mounting the defect detecting device 1 in this manner has following advantages.

Each image sensor module can have compute/determine functionality so that parallel processing is possible for spot and stain defects.

No time is needed to transfer image data from the image sensor module to the digital image quality tester or the image processing device. Inspection time is shortened.

The computation of the standard deviation of the intra-block sums, which is implemented by the defect detecting device 1, involves squaring. If the computation is difficult to implement in hardware, the operation of the defect detecting device 1 up to the image division may be implemented in hardware, with the following statistical processing and defect determination being implemented by the digital image quality tester. This simplifies the tester itself.

In the implementation example shown in FIG. 18, the image sensor module may be an "image sensor device." That is, some CMOS sensors, an example of the image sensor device, include a DSP section in the CMOS sensors.

In such an image sensor device, the defect detecting device 1 of the present embodiment may be provided to the DSP section inside the device. The implementation example in which the defect detecting device 1 is provide to the DSP section inside the image sensor device in this manner is regarded as a variation of the implementation example shown in FIG. 18.

Figure 19:
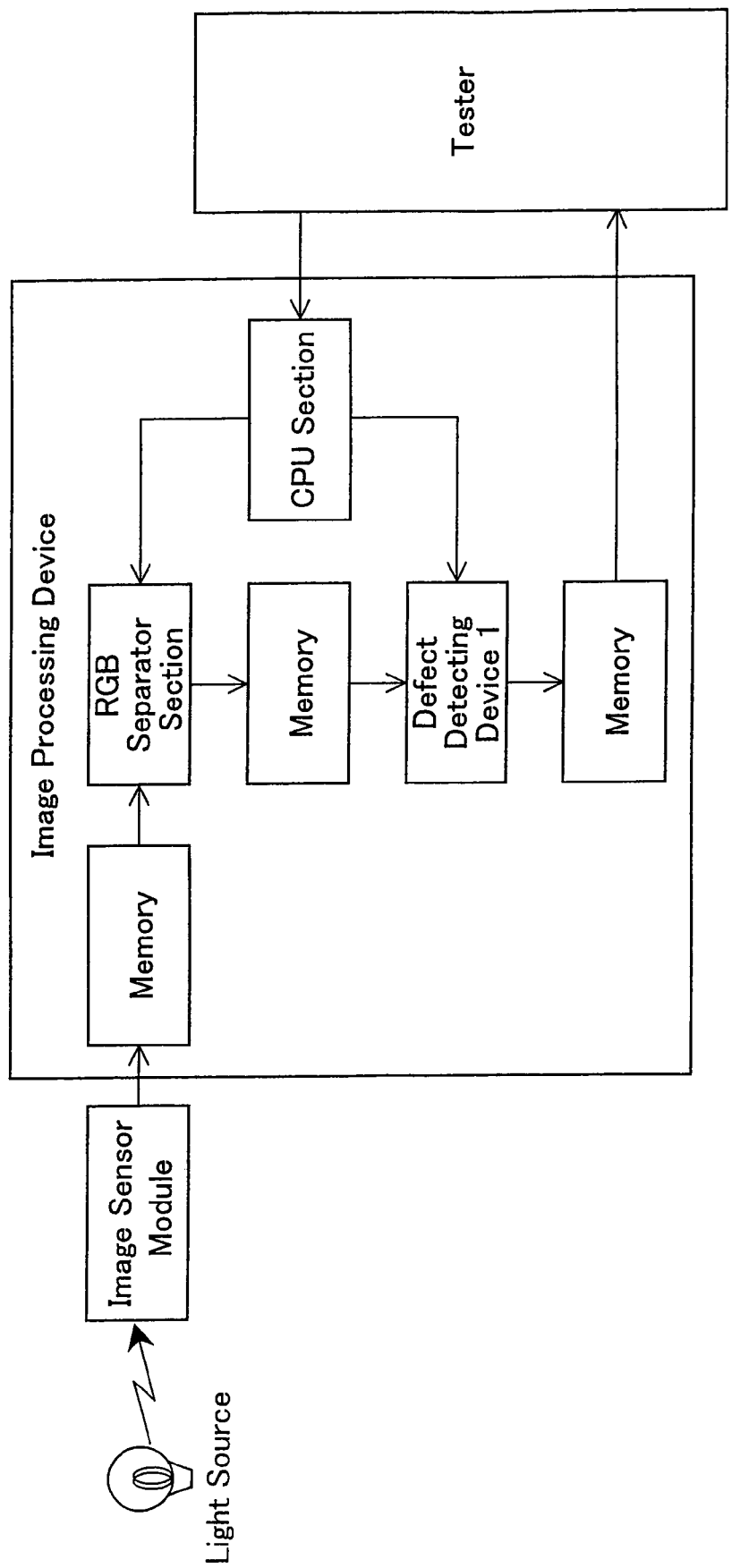
FIG. 19 illustrates another example structure of the inspection system.

The defect detecting device 1 of the present embodiment may provided outside the image sensor module. As shown in FIG. 19, for example, the defect detecting device 1 of the present embodiment may be provided in an image processing device including an RGB separator section, a CPU section, and a plurality of memories.

In the implementation example shown in FIG. 19; the inspection image may be fed from the image sensor device (not shown) in the image sensor module to a memory in the image processing device.

Figure 20:
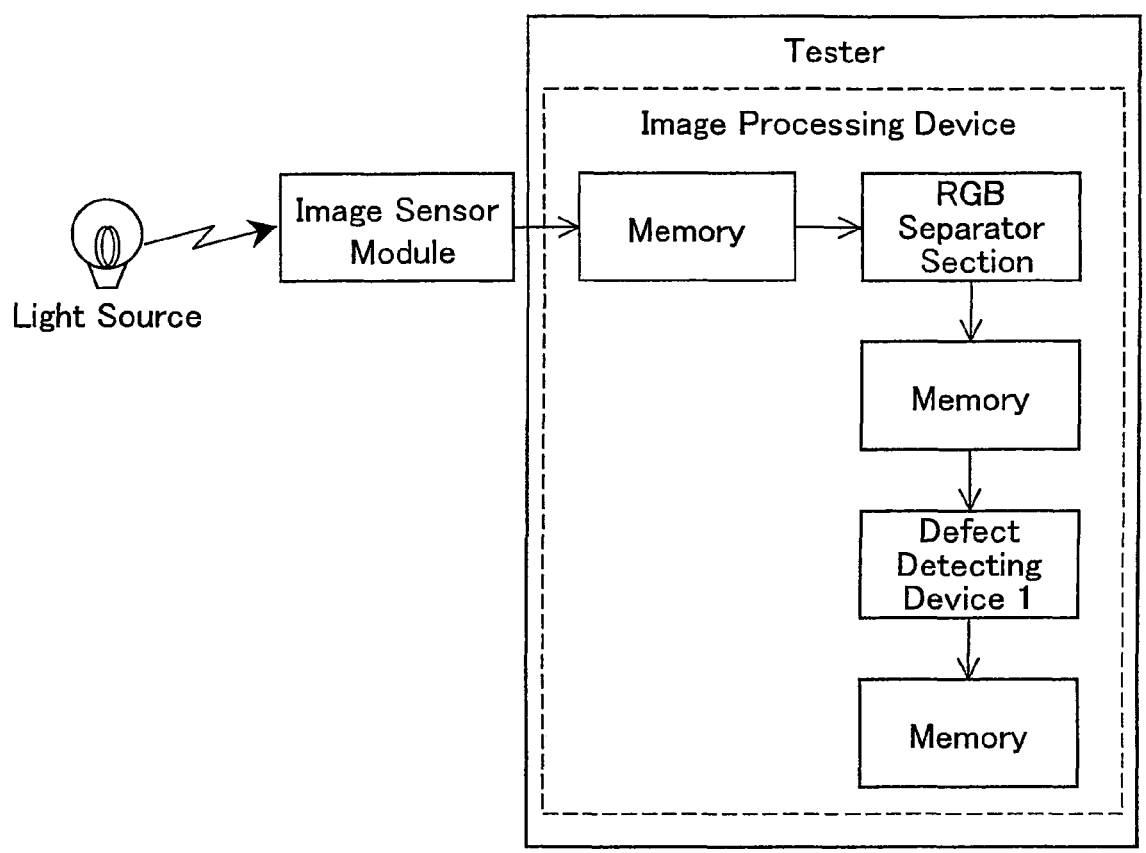
FIG. 20 illustrates still another example structure of the inspection system.
Figure 21:
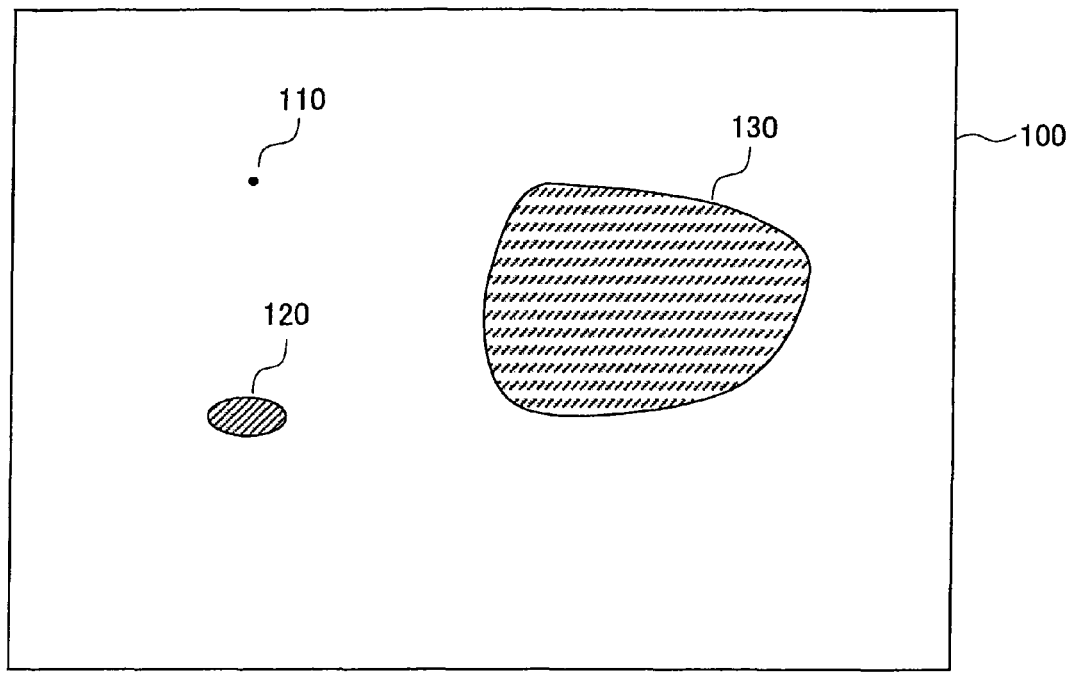
FIG. 21 is a schematic showing a point defect, spot defect, and stain defect in a digital image.
Figure 22:
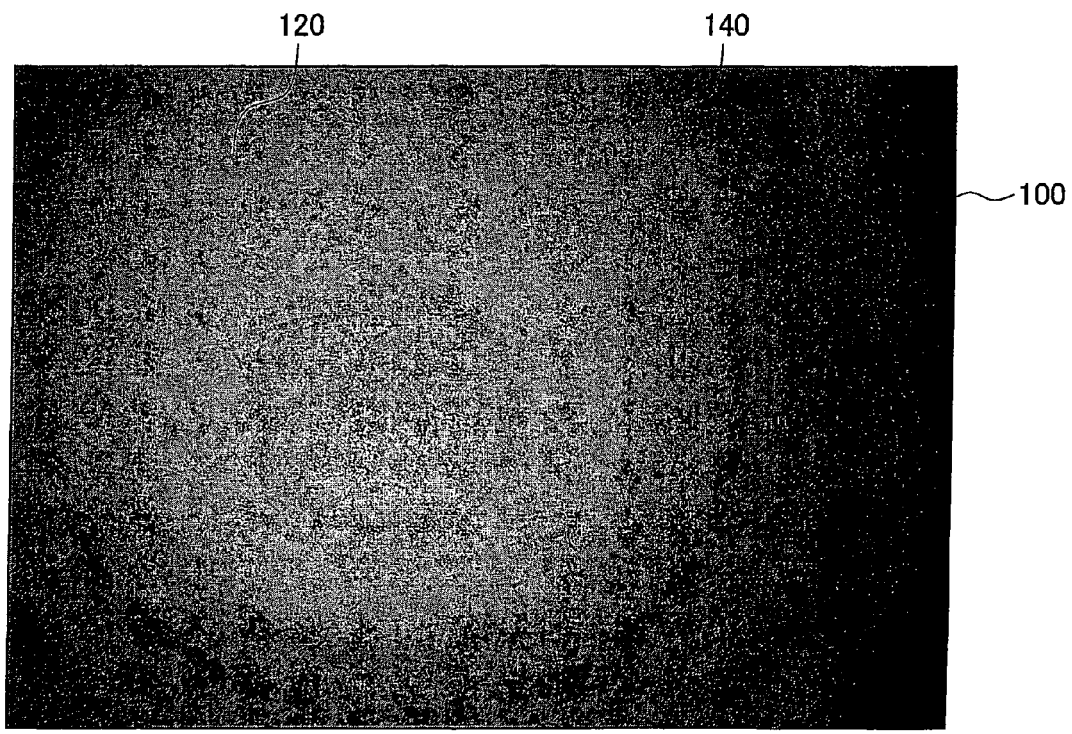
FIG. 22 shows shading in a digital image.
Figure 23:
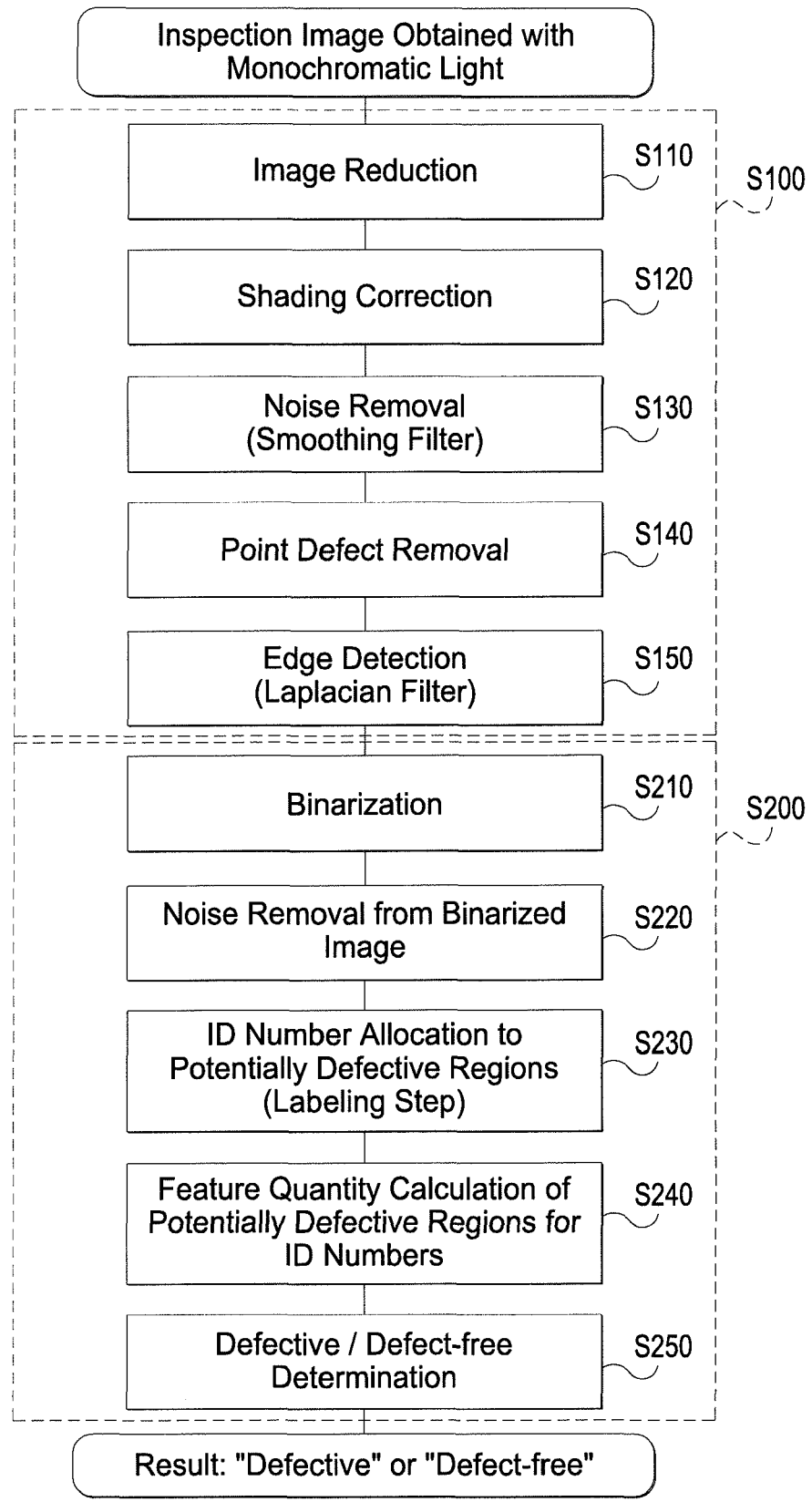
FIG. 23 is a flow chart of a conventional defect detecting method.
Figure 26:
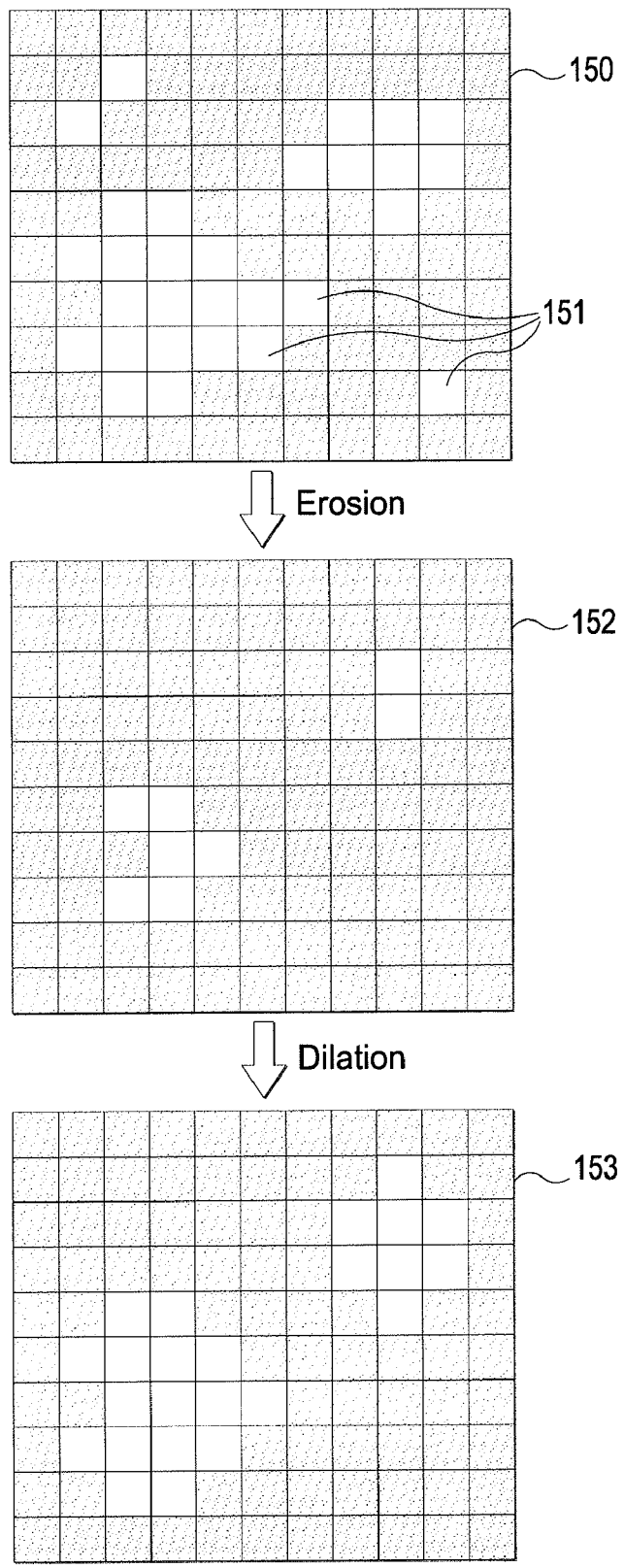
FIG. 26 depicts noise being removal from the inspection image 150 by dilation/erosion after a binarization step.
Figure 27:
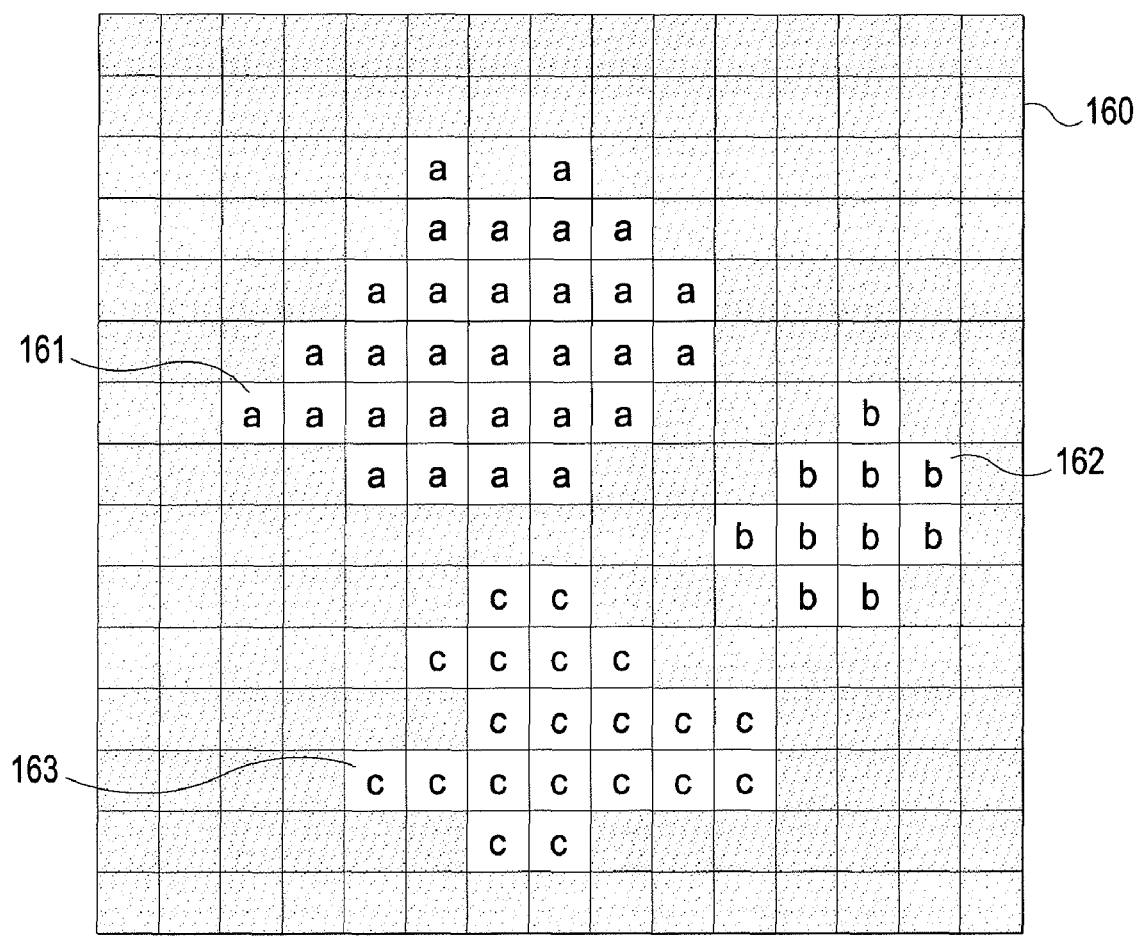
FIG. 27 depicts a labeling step which is a part of the conventional defect detecting method.

The defect detecting device 1 of the present embodiment may be provided inside the digital image quality tester. As shown in FIG. 20, the defect detecting device 1 of the present embodiment and the RGB separator section may be provided to the image processing section in the digital image quality tester.

In the implementation example shown in FIG. 20, the inspection image may be fed from the image sensor device (not shown) in the image sensor module to an image processing section in digital image quality tester.

9. Amount of Computation with Defect Detecting Method of the Present Embodiment The following is a quantitative comparison of the amount of computation needed in the defect detecting method of the present embodiment and the amount of computation needed in conventional art.

Letting N represent the number of pixels in an inspection image and a an image reduction ratio, the estimated number of times an image is scanned in conventional art is given as follows:

Number of Times Image is Scanned in Each Step in Defect Enhancement Process
    Image Reduction Step . . . N
    Shading Correction Step . . . 3*3*N/(a*a)
    (Each pixel is subjected to a 3×3 filter.)
    Noise Removing Step (Smoothing Filter Used) . . . 3*3*N/(a*a)
    Point Defect Removing Step . . . 3*3*N/(a*a)
    Edge Detecting Step (Laplacian Filter Used) . . . 3*3*N/(a*a)

Number of Times Image is Scanned in Each Step in Defective Region Extraction Process
    Binarization Step . . . N/(a*a)
    Noise Removing Step on Binary Image . . . (3*3*N/(a*a))*3
    (Image is scanned three times at the most moderate estimate.)
    Labeling Step . . . N/(a*a)
    (Image is scanned once at the most moderate estimate.)
    Calculation of spot area as a feature quantity . . . N/(a*a)
    Defect Determination . . . Very Few in Comparison with Total Scan Repetitions in Defective Region Extraction Process In contrast, letting b represent the image division size (number of pixels), the estimated number of times an image is scanned in the defect detecting method of the present embodiment is given as follows:

Number of Times Image is Scanned in Each Step in Defect Enhancement Process
    Image Reduction Step . . . N
    Point Defect Removing Step . . . 3*3*N/(a*a)
    Filtering . . . (3*3*N/(a*a))*2
    Two-staged Filtering with 9×9 Laplacian Filter (See FIG. 6(*a*) and FIG. 6(*b*))

Number of Times Image is Scanned in Each Step in Defective Region Extraction Process
    Block Generation and Sum Value Calculation . . . N/(a*a)
    Statistical Processing . . . N/(a*a*b*b)
    Defect Determination . . . N/(a*a*b*b)
    Substituting N=4,000,000 pixels, image reduction ratio a=2, and image division size (number of pixels) b=40 regarding the scan repetitions above, the following results are obtained.

Conventional Art
    Defect Enhancement Process . . . 40M
    Defective Region Extraction Process . . . 30M Total . . . 70M Defect Detecting Method of Present Embodiment
    Defect Enhancement Process . . . 31M
    Defective Region Extraction Process . . . 1.001M Total . . . 32.001M As evidenced here, the defect detecting method of the present embodiment implements almost the same number of image scans as the defect enhancement process in conventional art, to determine whether the inspection image contains a defect.

10. Supplement

The defect detecting method implemented by the defect detecting device of the present embodiment may be stored as a computer program in a computer-readable storage medium which stores computer programs implemented by a computer. As a result, an easily transportable storage medium can be provided which contains a computer program for the defect detecting method of the present embodiment.

The computer program storage medium may be a memory (not shown), such as a ROM, so that the process is executable on a microcomputer. Alternatively, a program medium may be used which is readable when loaded into an external storage device (program reader device; not shown).

In addition, in any case, the contained program may be accessible to a microprocessor which will execute the program. Further, the program may be read and then downloaded to a program storage area (not shown) in a microcomputer where the program is executed. Assume that the program to be downloaded is stored in a main body device in advance.

The computer program medium may be a storage medium adapted so that it is separable from the main body. Examples of such a program medium include a tape, such as a magnetic tape or a cassette tape; a magnetic disk, such as a flexible disk or a hard disk; an optical disc, such as a CD-ROM/MO/MD/DVD; a card, such as an IC/optical card (inclusive of a memory card); or a semiconductor memory, such as a mask ROM, an EPROM (erasable programmable read only memory), an EEPROM (electrically erasable programmable read only memory), or a flash ROM. All these media hold a program in a fixed manner.

Alternatively, in that case, since the system can be constructed so that it can connect to the Internet or other communications network, it is preferable if the program medium may be a medium which carries the program in a flowing manner as it does in the downloading of a program over the communications network. When the program is downloaded over a communications network in this manner, the program to be downloaded may be stored in advance in the receiver or installed from another storage medium.

The present invention is capable of determining whether there exists a defective region which can occur in a digital image, quickly and using small-scale circuitry.

A defect detecting device of the present invention is a defect detecting device which, in a digital image, detects a defective region where pixel data changes non-uniformly when compared with surrounding regions, the device including: a block generating section dividing an inspection image in which a defective region will be detected into a plurality of blocks; and an intra-block sum calculating section calculating an intra-block sum for each of the blocks generated by the block generating section, the intra-block sum being a sum of pixel data for pixels in that block, wherein the intra-block sum is fed to a defective region presence determining section determining whether there exists a defective region by determining through statistical processing whether the intra-block sums have an outlier.

The defect detecting device configured as above is preferably such that the block generating section divides the inspection image into a plurality of blocks so that adjacent blocks overlap each other.

If the inspection image is divided into a plurality of blocks so that there is no overlap between adjacent blocks, a defective region may occur over adjacent blocks. In that case, the defective region is divided between two different blocks, affecting both the intra-block sums of the two blocks. It may not be determined in a suitable manner whether there exists a defective region.

In contrast, according to the configuration, the block generating section divides the inspection image into a plurality of blocks so that adjacent blocks overlap each other. This ensures that the defective region is confined in one block. Accordingly, the defective region is prevented from affecting the intra-block sums of two different blocks. The defective region is detected at high sensitivity.

The defect detecting device configured as above may be such that the defective region presence determining section is provided inside thereof.

According to the configuration, the defective region presence determining section is provided inside the defect detecting device. The defect detecting device can perform the image division in the block generating section, the intra-block sum calculation in the intra-block sum calculating section, and the determination in the defective region presence determining section, all by itself. The use of only the defect detecting device configured as above make it possible to determine whether there exists a defective region.

The defective region presence determining section may be provided outside the defect detecting device.

According to the configuration, the defective region presence determining section is provided outside the defect detecting device; the device can let an external device implement the statistical processing through which it is determined whether the intra-block sums have an outlier. Accordingly, the defect detecting device only has to perform the image division in the block generating section and the intra-block sum calculation in the intra-block sum calculating section. This enables hardware implementation of the defect detecting device using small circuitry.

The defect detecting device configured as above is preferably such that the defective region presence determining section determines whether each of the intra-block sums calculated by the intra-block sum calculating section for the plurality of blocks generated by the block generating section is a statistical outlier.

According to the configuration, the defective region presence determining section determines whether each of the intra-block sums calculated by the intra-block sum calculating section for the plurality of blocks generated by the block generating section is a statistical outlier; the defective region presence determining section thus determines whether there exists a defective region for each of the blocks in the inspection image. It is determined whether there exists a defective region at high precision.

The defect detecting device configured as above may be such that the defective region presence determining section determines whether a maximum of the intra-block sums calculated by the intra-block sum calculating section for the plurality of blocks generated by the block generating section is a statistical outlier.

According to the configuration, the defective region presence determining section determines only whether the maximum intra-block sum is a statistical outlier; the section does not determine whether each intra-block sum calculated for a block generated by the block generating section is a statistical outlier. It can be determined whether there is a defective region in the digital image quickly and by simple processing.

The defect detecting device configured as above is preferably such that whether the intra-block sums have an outlier or not is determined by comparing an intra-block sum under consideration with a determination threshold specified from the number of the blocks into which the block generating section divides the inspection image and a statistical significance level.

According to the configuration, the determination threshold is obtained statistically. It is appropriately determined whether the intra-block sum is an outlier. Therefore, it is appropriately determined whether there exists a defective region.

The defect detecting device configured as above may be such that whether the intra-block sums have an outlier or not is determined by comparing an intra-block sum under consideration with a determination threshold obtained by statistically processing intra-block sums calculated from a good quality image which provides a defect-free reference.

According to the configuration, the determination threshold is obtainable merely by preparing a good quality image. The determination threshold is obtainable by simple processing. Whether the intra-block sums have an outlier or not is determined by simple processing. Whether there exists a defective region or not is determined more quickly.

The inspection image is preferably fed from an image sensor device.

The need to detect a defective region is especially high with digital images obtained from image sensor devices. According to the configuration, it can be determined whether there exists a defective region in those images.

The defect detecting device configured as above may be provided in an image sensor device, an image sensor module, an image processing device, or a digital image quality tester.

The "image sensor device" refers to a CMOS sensor, CCD, or like image pickup device. The "image sensor module" refers to a module containing a CMOS sensor, CCD, or like image pickup device with a lens, either a control DSP or a clock generator, etc. Therefore, the image sensor device is encompassed by the image sensor module.

The "digital image quality tester" refers to, as the name literally implies, a tester which inspects digital image quality. The digital image quality tester may inspect a digital image obtained from an image sensor device or like semiconductor device or a digital image fed to/from a liquid crystal panel or like digital image display device.

A digital image quality tester of the present invention is a digital image quality tester externally connected to a defect detecting device which, in a digital image, detects a defective region where pixel data changes non-uniformly when compared with surrounding regions, the device including: a block generating section dividing an inspection image in which a defective region will be detected into a plurality of blocks; and an intra-block sum calculating section calculating an intra-block sum for each of the blocks generated by the block generating section, the intra-block sum being a sum of pixel data for pixels in that block, the tester including a defective region presence determining section determining whether there exists a defective region by determining through statistical processing of the intra-block sums fed from the intra-block sum calculating section whether the intra-block sums have an outlier.

Furthermore, the digital image quality tester configured as above is preferably such that the defect detecting device is provided outside thereof.

According to the configuration, the defect detecting device is provided outside the digital image quality tester. The tester can perform the image division in the block generating section and the intra-block sum calculation in the intra-block sum calculating section outside the digital image quality tester. Accordingly, the digital image quality tester has only to carry out statistical processing though which it is determined whether the intra-block sums have an outlier. This enables a quick determination as to whether there exists a defective region.

Another defect detecting device of the present invention is a defect detecting device which, in a digital image, detects a defective region where pixel data changes non-uniformly when compared with surrounding regions, the device including a filtering section enhancing the defective region in an inspection image in which the defective region will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

The defect detecting device configured as above is preferably such that the filtering section implements the Laplacian filter by way of a first filter and a second filter, the first filter being a (n/3)×(m/3) filter and having weight coefficients that are all equal, the second filter being composed of nine (n/3)×(m/3) blocks, the blocks having associated central weight coefficients which are, when added up, equal to 0.

According to the configuration, the computation using the n×m Laplacian filter is reduced. For example, assuming that n=9 and m=9 and that the 9×9 Laplacian filter is applied to an inspection image containing N pixels, the computation using that filter is 81N sets of multiplications and additions. The two-staged filtering involving the first and second filters reduces the multiplications and additions to 18N. Furthermore, the first and second filters can perform the same filtering as the n×m Laplacian filter. It is thus possible to more quickly determine whether there exists a defective region.

The defect detecting device configured as above is preferably externally connected to a point defect removing section which removes, from the inspection image, a point defect where pixel data for a pixel is markedly different from surrounding pixel data, wherein the filtering section subjects the inspection image from which the point defect has been removed to filtering using an n×m Laplacian filter.

According to the configuration, the device subjects the inspection image from which the point defect removing section has removed point defects to filtering using the n×m Laplacian filter so as to enhance defective regions. In other words, point defects which are possible defective regions are removed from the inspection image before the filtering. The point defects are thus prevented from being detected as defective regions. This provides improved precision in the detection of defective regions.

In addition, the point defect removal by the point defect removing section is performed outside the defect detecting device. The defect detecting device has only to carry out filtering using the n×m Laplacian filter. This permits the defect detecting device not to implement high complexity processing.

The defect detecting device configured as above is preferably externally connected to an image reduction section which reduces the inspection image, wherein the filtering section subjects the reduced inspection image to filtering using an n×m Laplacian filter.

According to the configuration, the image reduction section reduces the inspection image. The data size of the inspection image is reduced, and defective regions in the inspection image are enhanced.

In addition, the image reduction section implements the image reduction step outside the defect detecting device. The defect detecting device has only to carry out filtering using the n×m Laplacian filter. This permits the defect detecting device not to implement high complexity processing.

The defect detecting device configured as above may further include a point defect removing section which removes, from the inspection image, a point defect where pixel data for a pixel is markedly different from surrounding pixel data, wherein the filtering section subjects the inspection image from which the point defect has been removed to filtering using an n×m Laplacian filter.

According to the configuration, the device subjects the inspection image from which the point defect removing section has removed the point defect to filtering using the n×m Laplacian filter so as to enhance defective regions. In other words, point defects which are possible defective regions are removed from the inspection image before the filtering. The point defects are thus prevented from being detected as defective regions. This provides improved precision in the detection of defective regions.

The defect detecting device configured as above further preferably includes an image reduction section which reduces the inspection image, wherein the filtering section subjects the reduced inspection image to filtering using an n×m Laplacian filter.

According to the configuration, the image reduction section reduces the inspection image. The data size of the inspection image is reduced, and defective regions in the inspection image are enhanced.

The defect detecting device configured as above may be provided to in image sensor device or a digital image quality tester.

The same functions and effects as with the defect detecting method of the present invention can be achieved on a computer executing a defect detecting program implementing the defect detecting method. Furthermore, the defect detecting program can be executed on a given computer if the defect detecting computer program is contained in a computer-readable storage medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims

What is claimed is:

1. A defect detecting device which, in a digital image, detects a defective region where pixel data changes non-uniformly when compared with surrounding regions, the defect detecting device comprising:
   a block generating section dividing an inspection image in which a defective region will be detected into a plurality of blocks; and
   an intra-block sum calculating section calculating an intra-block sum for each of the blocks generated by the block generating section, the intra-block sum being a sum of pixel data for pixels in that block,
   wherein the intra-block sum is fed to a defective region presence determining section determining whether there exists the defective region where pixel data changes non-uniformly when compared with surrounding regions by determining through statistical processing whether the intra-block sums have an outlier.

2. The defect detecting device of claim 1, wherein the block generating section divides the inspection image into a plurality of blocks so that adjacent blocks overlap each other.

3. The defect detecting device of claim 1, wherein the defective region presence determining section is provided inside thereof.

4. The defect detecting device of claim 1, wherein the defective region presence determining section is provided outside thereof.

5. The defect detecting device of claim 1, wherein the defective region presence determining section determines whether each of the intra-block sums calculated by the intra-block sum calculating section for the plurality of blocks generated by the block generating section is a statistical outlier.

6. The defect detecting device of claim 1, wherein the defective region presence determining section determines whether a maximum of the intra-block sums calculated by the intra-block sum calculating section for the plurality of blocks generated by the block generating section is a statistical outlier.

7. The defect detecting device of claim 1, wherein whether the intra-block sums have an outlier or not is determined by comparing an intra-block sum under consideration with a determination threshold specified from the number of the blocks into which the block generating section divides the inspection image and a statistical significance level.

8. The defect detecting device of claim 1, wherein whether the intra-block sums have an outlier or not is determined by comparing an intra-block sum under consideration with a determination threshold obtained by statistically processing intra-block sums calculated from a good quality image which provides a defect-free reference.

9. The defect detecting device of claim 1, wherein the inspection image is fed from an image sensor device.

10. An image sensor device, comprising a defect detecting device which, in a digital image, detects a defective region where pixel data changes non-uniformly when compared with surrounding regions, the defect detecting device comprising:
    a block generating section dividing an inspection image in which a defective region will be detected into a plurality of blocks; and
    an intra-block sum calculating section calculating an intra-block sum for each of the blocks generated by the block generating section, the intra-block sum being a sum of pixel data for pixels in that block,
    wherein the intra-block sum is fed to a defective region presence determining section determining whether there exists the defective region where pixel data changes non-uniformly when compared with surrounding regions by determining through statistical processing whether the intra-block sums have an outlier.

11. An image sensor module, comprising a defect detecting device which, in a digital image, detects a defective region where pixel data changes non-uniformly when compared with surrounding regions, the defect detecting device comprising:
    a block generating section dividing an inspection image in which a defective region will be detected into a plurality of blocks; and
    an intra-block sum calculating section calculating an intra-block sum for each of the blocks generated by the block generating section, the intra-block sum being a sum of pixel data for pixels in that block,
    wherein the intra-block sum is fed to a defective region presence determining section determining whether there exists the defective region where pixel data changes non-uniformly when compared with surrounding regions by determining through statistical processing whether the intra-block sums have an outlier.

12. An image processing device, comprising a defect detecting device which, in a digital image, detects a defective region where pixel data changes non-uniformly when compared with surrounding regions, the defect detecting device comprising:
    a block generating section dividing an inspection image in which a defective region will be detected into a plurality of blocks; and
    an intra-block sum calculating section calculating an intra-block sum for each of the blocks generated by the block generating section, the intra-block sum being a sum of pixel data for pixels in that block,
    wherein the intra-block sum is fed to a defective region presence determining section determining whether there exists the defective region where pixel data changes non-uniformly when compared with surrounding regions by determining through statistical processing whether the intra-block sums have an outlier.

13. A digital image quality tester, comprising a defect detecting device which, in a digital image, detects a defective region where pixel data changes non-uniformly when compared with surrounding regions, the defect detecting device comprising:
    a block generating section dividing an inspection image in which a defective region will be detected into a plurality of blocks; and
    an intra-block sum calculating section calculating an intra-block sum for each of the blocks generated by the block generating section, the intra-block sum being a sum of pixel data for pixels in that block,
    wherein the intra-block sum is fed to a defective region presence determining section determining whether there exists the defective region where pixel data changes non-uniformly when compared with surrounding regions by determining through statistical processing whether the intra-block sums have an outlier.

14. A digital image quality tester externally connected to a defect detecting device which, in a digital image, detects a defective region where pixel data changes non-uniformly when compared with surrounding regions, the defect detecting device comprising:
a block generating section dividing an inspection image in which a defective region will be detected into a plurality of blocks; and
an intra-block sum calculating section calculating an intra-block sum for each of the blocks generated by the block generating section, the intra-block sum being a sum of pixel data for pixels in that block,
the tester comprising a defective region presence determining section determining whether there exists the defective region where pixel data changes non-uniformly when compared with surrounding regions by determining through statistical processing of the intra-block sums fed from the intra-block sum calculating section whether the intra-block sums have an outlier.

15. The digital image quality tester of claim 14, wherein the defect detecting device is provided outside thereof.

16. A defect detecting device which, in a digital image, detects a defective region where pixel data changes non-uniformly when compared with surrounding regions, the defect detecting device comprising
a filtering section enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

17. The defect detecting device of claim 16, wherein the filtering section implements the Laplacian filter by way of a first filter and a second filter, the first filter being a (n/3)×(m/3) filter and having weight coefficients that are all equal, the second filter being composed of nine (n/3)×(m/3) blocks, the blocks having associated central weight coefficients which are, when added up, equal to 0.

18. The defect detecting device of claim 16, externally connected to a point defect removing section which removes, from the inspection image, a point defect where pixel data for a pixel is markedly different from surrounding pixel data, wherein the filtering section subjects the inspection image from which the point defect has been removed to filtering using an n×m Laplacian filter.

19. The defect detecting device of claim 16, externally connected to an image reduction section which reduces the inspection image, wherein the filtering section subjects the reduced inspection image to filtering using an n×m Laplacian filter.

20. The defect detecting device of claim 16, further comprising a point defect removing section which removes, from the inspection image, a point defect where pixel data for a pixel is markedly different from surrounding pixel data, wherein the filtering section subjects the inspection image from which the point defect has been removed to filtering using an n×m Laplacian filter.

21. The defect detecting device of claim 16, further comprising an image reduction section which reduces the inspection image, wherein the filtering section subjects the reduced inspection image to filtering using an n×m Laplacian filter.

22. An image sensor device, comprising
a defect detecting device which, in a digital image, detects a defective region where pixel data changes non-uniformly when compared with surrounding regions, the defect detecting device comprising
a filtering section enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

23. An image sensor module, comprising
a defect detecting device which, in a digital image, detects a defective region where pixel data changes non-uniformly when compared with surrounding regions, the defect detecting device comprising
a filtering section enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

24. An image processing device, comprising
a defect detecting device which, in a digital image, detects a defective region where pixel data changes non-uniformly when compared with surrounding regions, the defect detecting device comprising
a filtering section enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

25. A digital image quality tester, comprising
a defect detecting device which, in a digital image, detects a defective region where pixel data changes non-uniformly when compared with surrounding regions, the defect detecting device comprising
a filtering section enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

26. A method of detecting, in a digital image, a defective region where pixel data changes non-uniformly when compared with surrounding regions, the method comprising:

the block generating step of dividing an inspection image in which a defective region will be detected into a plurality of blocks;

the intra-block sum calculating step of calculating an intra-block sum for each of the blocks generated in the block generating step, the intra-block sum being a sum of pixel data for pixels in that block; and the defective region presence determining step of determining whether there exists the defective region where pixel data changes non-uniformly when compared with surrounding regions by determining through statistical processing whether the intra-block sums have an outlier.

27. A method of detecting, in a digital image, a defective region where pixel data changes non-uniformly when compared with surrounding regions, the method comprising the filtering step of enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

28. The method of claim 27, further comprising the point defect removing step of removing, from the inspection image, a point defect where pixel data for a pixel is markedly different from surrounding pixel data, wherein in the filtering step, the inspection image from which the point defect has been removed is subjected to filtering using an n×m Laplacian filter.

29. The method of claim 27, further comprising the image reduction step of reducing the inspection image, wherein in the filtering step, the reduced inspection image is subjected to filtering using an n×m Laplacian filter.

30. A defect detecting computer program stored on a non-transitory medium causing a computer to implement a method of detecting, in a digital image, a defective region where pixel data changes non-uniformly when compared with surrounding regions, the method comprising:

the block generating step of dividing an inspection image in which a defective region will be detected into a plurality of blocks;

the intra-block sum calculating step of calculating an intra-block sum for each of the blocks generated in the block generating step, the intra-block sum being a sum of pixel data for pixels in that block; and the defective region presence determining step of determining whether there exists the defective region where pixel data changes non-uniformly when compared with surrounding regions by determining through statistical processing whether the intra-block sums have an outlier.

31. A defect detecting computer program stored on a non-transitory medium causing a computer to implement a method of detecting, in a digital image, a defective region where pixel data changes non-uniformly when compared with surrounding regions, the method comprising the filtering step of enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

32. A non-transitory computer-readable storage medium containing a defect detecting computer program causing a computer to implement a method of detecting, in a digital image, a defective region where pixel data changes non-uniformly when compared with surrounding regions, the method comprising:

the block generating step of dividing an inspection image in which a defective region will be detected into a plurality of blocks;

the intra-block sum calculating step of calculating an intra-block sum for each of the blocks generated in the block generating step, the intra-block sum being a sum of pixel data for pixels in that block; and the defective region presence determining step of determining whether there exists the defective region where pixel data changes non-uniformly when compared with surrounding regions by determining through statistical processing whether the intra-block sums have an outlier.

33. A non-transitory computer-readable storage medium containing a defect detecting computer program causing a computer to implement a method of detecting, in a digital image, a defective region where pixel data changes non-uniformly when compared with surrounding regions, the method comprising the filtering step of enhancing the defective region in an inspection image in which the defective region where pixel data changes non-uniformly when compared with surrounding regions will be detected, the enhancement involving use of an n×m Laplacian filter composed of nine (n/3)×(m/3) blocks where n, m represent the number of pixels and are multiples of 3, each of the (n/3)×(m/3) blocks being designed to integrate pixel data, the Laplacian filter being a highpass filter from which a second order derivative is obtained.

* * * * *